(12) United States Patent
Grant et al.

(10) Patent No.: US 12,403,516 B2
(45) Date of Patent: Sep. 2, 2025

(54) SHAPE PROCESSES, FEEDSTOCK MATERIALS, CONDUCTIVE MATERIALS AND/OR ASSEMBLIES

(71) Applicant: Battelle Memorial Institute, Richland, WA (US)

(72) Inventors: Glenn J. Grant, Benton City, WA (US); Keerti S. Kappagantula, Richland, WA (US); Xiao Li, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/035,597

(22) Filed: Sep. 28, 2020

(65) Prior Publication Data

US 2021/0197241 A1   Jul. 1, 2021

Related U.S. Application Data

(63) Continuation-in-part of application No. 16/562,314, filed on Sep. 5, 2019, now Pat. No. 11,383,280, which
(Continued)

(51) Int. Cl.
*B21C 23/00* (2006.01)
*B21C 23/04* (2006.01)
(Continued)

(52) U.S. Cl.
CPC ............ *B21C 23/002* (2013.01); *B21C 23/04* (2013.01); *B23K 20/1255* (2013.01); *B23K 2103/20* (2018.08)

(58) Field of Classification Search
CPC ... B21C 23/001; B21C 23/002; B21C 23/007; B21C 23/04; B21C 23/08; B21C 23/085;
(Continued)

(56) References Cited

U.S. PATENT DOCUMENTS 3,432,369 A   3/1969   Naastepad
3,640,657 A   2/1972   Rowe et al.
(Continued)

FOREIGN PATENT DOCUMENTS

AU   2002361320 A   12/2002
CN   106140847 A   11/2016
(Continued)

OTHER PUBLICATIONS

Luo, Alan, "Magnesium: Current and Potential Automotive Applications", JOM, 54(2), 2002, United States, pp. 42-48.
(Continued)

*Primary Examiner* — Aneeta Yodichkas
*Assistant Examiner* — Joshua D Anderson
(74) *Attorney, Agent, or Firm* — Schwegman, Lundberg & Woessner, P.A.

(57) ABSTRACT

Shear assisted extrusion processes (ShAPE) for forming Metal-NCCF extrusions are provided. The processes can include: using a die tool, applying a rotational shearing force and an axial extrusion force to a feedstock material comprising a metal and NCCF (NanoCrystalline Carbon Films); and extruding a mixture comprising the metal and NCCF through an opening in the die tool to form the Metal-NCCF extrusion. ShAPE feedstock materials are provided that can include a metal and NCCF. Conductive solid material mixtures are provided that can include a metal and a NCCF. Portions of the metals and NCCF of the material mixtures can have an isotropic crystallographic orientation. Assemblies relying in part on conductivity can include: a conductive solid material mixture that includes: a metal; and a NCCF.

24 Claims, 38 Drawing Sheets
(25 of 38 Drawing Sheet(s) Filed in Color)

Related U.S. Application Data is a continuation-in-part of application No. 16/028,173, filed on Jul. 5, 2018, now Pat. No. 11,045,851, which is a continuation-in-part of application No. 15/898,515, filed on Feb. 17, 2018, now Pat. No. 10,695,811, which is a continuation-in-part of application No. 15/351,201, filed on Nov. 14, 2016, now Pat. No. 10,189,063, which is a continuation-in-part of application No. 14/222,468, filed on Mar. 21, 2014, now abandoned.

(60) Provisional application No. 62/906,911, filed on Sep. 27, 2019, provisional application No. 62/460,227, filed on Feb. 17, 2017, provisional application No. 62/313,500, filed on Mar. 25, 2016, provisional application No. 61/804,560, filed on Mar. 22, 2013.

(51) Int. Cl.
*B23K 20/12* (2006.01)
*B23K 103/20* (2006.01)

(58) Field of Classification Search
CPC ..... B21C 23/18; B21C 23/183; B21C 23/186; B21C 23/20; B21C 23/205; B21C 23/21; B21C 23/212; B21C 23/217; B21C 23/218; B21C 23/22; B21C 25/02; B21C 26/00; B21C 27/00; B21C 33/004; B22F 3/20; B22F 2003/208; B22F 2301/052; B22F 2301/058; B22F 2301/10; B23K 20/122; B23K 20/1255; B23K 20/1275; B23K 20/2333; B23K 20/2336; B23K 2103/10; B23K 2103/15; B23K 2103/18; B23K 2103/20
See application file for complete search history.

(56) References Cited

U.S. PATENT DOCUMENTS

| | | |
|---|---|---|
| 3,661,726 A | 5/1972 | Denes |
| 3,684,593 A | 8/1972 | Benz et al. |
| 3,884,062 A | 5/1975 | Green |
| 3,892,603 A | 7/1975 | Reid |
| 3,933,536 A | 1/1976 | Doser et al. |
| 3,977,918 A | 8/1976 | Paladino et al. |
| 3,989,548 A | 11/1976 | Morris |
| 4,287,749 A | 9/1981 | Bachrach et al. |
| 4,300,378 A | 11/1981 | Thiruvarudchelvan |
| 4,431,467 A | 2/1984 | Staley et al. |
| 4,585,473 A | 4/1986 | Narasimhan et al. |
| 4,778,542 A | 10/1988 | Clemens |
| 4,801,340 A | 1/1989 | Inoue et al. |
| 4,808,224 A | 2/1989 | Anderson et al. |
| 4,892,596 A | 1/1990 | Chatterjee |
| 4,985,085 A | 1/1991 | Chatterjee |
| 5,026,438 A | 6/1991 | Young et al. |
| 5,089,060 A | 2/1992 | Bradley et al. |
| 5,226,989 A | 7/1993 | Sukonnik |
| 5,242,508 A | 9/1993 | McCallum et al. |
| 5,262,123 A | 11/1993 | Thomas et al. |
| 5,283,130 A | 2/1994 | Bradley et al. |
| 5,437,545 A | 8/1995 | Hirai |
| 5,461,898 A | 10/1995 | Lessen |
| 5,470,401 A | 11/1995 | McCallum et al. |
| 5,492,264 A | 2/1996 | Wadleigh |
| 5,737,959 A | 4/1998 | Korbel et al. |
| 5,739,498 A | 4/1998 | Sunamoto et al. |
| 5,964,117 A | 10/1999 | Holroyd et al. |
| 5,988,484 A | 11/1999 | Osborn et al. |
| 6,022,424 A | 2/2000 | Sellers et al. |
| 6,036,467 A | 3/2000 | Jameson |
| 6,638,462 B2 | 10/2003 | Davidson et al. |
| 6,843,405 B2 | 1/2005 | Okamoto et al. |
| 6,940,379 B2 | 9/2005 | Creighton |
| 7,096,705 B2 | 8/2006 | Segal |
| 7,314,670 B2 | 1/2008 | Bartsch et al. |
| 7,322,508 B2 | 1/2008 | Chang |
| 7,954,692 B2 | 6/2011 | Fukuda |
| 8,016,179 B2 | 9/2011 | Burford |
| 8,240,540 B2 | 8/2012 | Tanaka et al. |
| 8,313,692 B2 | 11/2012 | Somekawa et al. |
| 8,695,868 B2 | 4/2014 | Messer et al. |
| 10,189,063 B2 | 1/2019 | Lavender et al. |
| 10,369,748 B2 | 8/2019 | Whalen et al. |
| 10,695,811 B2 | 6/2020 | Joshi et al. |
| 10,987,754 B1 | 4/2021 | Eller et al. |
| 11,045,851 B2 | 6/2021 | Joshi et al. |
| 2002/0029601 A1 | 3/2002 | Kwok |
| 2004/0057782 A1 | 3/2004 | Okamoto et al. |
| 2004/0238501 A1 | 12/2004 | Kawazoe et al. |
| 2004/0265503 A1 | 12/2004 | Clayton et al. |
| 2005/0081594 A1 | 4/2005 | Segal |
| 2006/0005898 A1 | 1/2006 | Lui et al. |
| 2006/0027628 A1 | 2/2006 | Sutherlin et al. |
| 2008/0029581 A1 | 2/2008 | Kumagai et al. |
| 2008/0048005 A1 | 2/2008 | Forrest et al. |
| 2008/0202653 A1 | 8/2008 | Ignberg |
| 2008/0251571 A1 | 10/2008 | Burford |
| 2009/0072007 A1 | 3/2009 | Nagano |
| 2009/0269605 A1 | 10/2009 | Warke et al. |
| 2009/0291322 A1 | 11/2009 | Watanabe et al. |
| 2010/0059151 A1 | 3/2010 | Iwamura et al. |
| 2010/0089976 A1 | 4/2010 | Szymanski et al. |
| 2010/0132430 A1 | 6/2010 | Tsai et al. |
| 2011/0104515 A1 | 5/2011 | Kou et al. |
| 2011/0132970 A1 | 6/2011 | Nakagawa et al. |
| 2011/0309131 A1 | 12/2011 | Hovanski et al. |
| 2012/0006086 A1 | 1/2012 | Manchiraju et al. |
| 2012/0052322 A1 | 3/2012 | Hatakeyama et al. |
| 2012/0168045 A1 | 7/2012 | Ihara et al. |
| 2012/0223451 A1 | 9/2012 | Hulseman et al. |
| 2012/0258332 A1 | 10/2012 | Hatakeyama et al. |
| 2013/0075452 A1 | 3/2013 | Burford |
| 2013/0266467 A1 | 10/2013 | Manchiraju et al. |
| 2014/0000332 A1 | 1/2014 | Wilson et al. |
| 2014/0002220 A1 | 1/2014 | Johnson et al. |
| 2014/0076957 A1 | 3/2014 | Sayama et al. |
| 2014/0102159 A1 | 4/2014 | Denison |
| 2014/0102161 A1 | 4/2014 | Stewart |
| 2014/0248508 A1 | 9/2014 | Ohhama et al. |
| 2014/0260489 A1 | 9/2014 | Funk et al. |
| 2014/0283574 A1 | 9/2014 | Lavender et al. |
| 2014/0291886 A1 | 10/2014 | Mark et al. |
| 2014/0328710 A1 | 11/2014 | Cui et al. |
| 2015/0075242 A1 | 3/2015 | Eller et al. |
| 2015/0115019 A1 | 4/2015 | Pascal et al. |
| 2015/0360317 A1 | 12/2015 | Kalvala et al. |
| 2016/0008918 A1 | 1/2016 | Burford |
| 2016/0151817 A1* | 6/2016 | Nayfeh ............... H01B 1/026 29/599 |
| 2016/0151818 A1 | 6/2016 | Shao |
| 2016/0167353 A1 | 6/2016 | Fan et al. |
| 2016/0175981 A1 | 6/2016 | Kandasamy |
| 2016/0175982 A1 | 6/2016 | Kandasamy et al. |
| 2016/0184922 A1 | 6/2016 | Kikyo |
| 2016/0228932 A1 | 8/2016 | Hayashi et al. |
| 2016/0354860 A1 | 12/2016 | Boettcher et al. |
| 2017/0008121 A1 | 1/2017 | Li |
| 2017/0056947 A1 | 3/2017 | Lavender et al. |
| 2017/0136686 A1 | 5/2017 | Ueno et al. |
| 2017/0163135 A1 | 6/2017 | Emberton et al. |
| 2017/0182587 A1 | 6/2017 | Tokoro et al. |
| 2017/0216961 A1 | 8/2017 | Utter et al. |
| 2017/0225265 A1 | 8/2017 | Ito et al. |
| 2017/0304933 A1 | 10/2017 | Miles et al. |
| 2017/0355003 A1 | 12/2017 | TenHouten et al. |
| 2018/0036840 A1 | 2/2018 | Hu et al. |
| 2018/0043467 A1 | 2/2018 | Huysmans |
| 2018/0050419 A1 | 2/2018 | Das et al. |
| 2018/0311713 A1 | 11/2018 | Joshi et al. |
| 2018/0354231 A1 | 12/2018 | Iwase |
| 2018/0369889 A1 | 12/2018 | Zhang et al. |

(56) References Cited

U.S. PATENT DOCUMENTS

| | | | |
|---|---|---|---|
| 2019/0267153 A1* | 8/2019 | Kappagantula | H01B 1/023 |
| 2019/0275608 A1 | 9/2019 | Das et al. | |
| 2021/0053100 A1 | 2/2021 | Whalen et al. | |
| 2021/0086291 A1 | 3/2021 | Okada et al. | |
| 2021/0205918 A1 | 7/2021 | Fujii et al. | |
| 2021/0252632 A1 | 8/2021 | Eller et al. | |
| 2021/0402471 A1 | 12/2021 | Whalen et al. | |
| 2022/0297174 A1 | 9/2022 | Whalen et al. | |
| 2023/0042802 A1 | 2/2023 | Whalen et al. | |
| 2023/0081786 A1 | 3/2023 | Joshi et al. | |
| 2023/0088412 A1 | 3/2023 | Joshi et al. | |
| 2023/0150022 A1 | 5/2023 | Whalen et al. | |
| 2023/0234115 A1 | 7/2023 | Kappagantula et al. | |

FOREIGN PATENT DOCUMENTS

| | | |
|---|---|---|
| CN | 107282671 A | 10/2017 |
| CN | 105925846 B | 2/2018 |
| CN | 109295332 B | 4/2020 |
| EP | 2990178 | 8/2014 |
| EP | 2777837 A1 | 9/2014 |
| EP | 3817872 | 2/2025 |
| GB | 1258141 | 12/1971 |
| JP | 2003-275876 | 9/2003 |
| JP | 2004174563 | 6/2004 |
| JP | 2007-222925 | 9/2007 |
| JP | 2009090359 A | 4/2009 |
| JP | 2019115909 A | 7/2019 |
| KR | 101316989 B1 | 10/2013 |
| WO | WO-2020010331 A1 | 1/2020 |
| WO | WO-2020053168 A1 | 3/2020 |
| WO | WO PCT/US2019/040730 | 1/2021 |
| WO | WO PCT/US2020/053168 | 2/2021 |
| WO | WO-2021062415 A1 | 4/2021 |
| WO | WO-2022056358 A1 | 3/2022 |
| WO | WO PCT/US2021/050022 | 12/2022 |
| WO | WO PCT/US22/43532 | 1/2023 |
| WO | WO PCT/US2023/015228 | 6/2023 |
| WO | WO-2023177693 A1 | 9/2023 |

OTHER PUBLICATIONS

Nakamura et al., "Tool Temperature and Process Modeling of Friction Stir Welding", (2018) Modern Mechanical Engineering, 8, 78-94.

Zhang et al., "Numerical Studies on Effect of Axial Pressure in Friction Stir Welding", (2007) Science and Technology of Welding and Joining, vol. 12, No. 3, United Kingdom, pp. 226-248.

Pickens, "Aluminum Powder Metallurgy Technology for High-Strength Applications", Journal of Materials Science 16 (1981) 1437-1457, United Kingdom, 21 pages.

Whalen et al., "High Ductility Aluminum Alloy Made from Powder by Friction Extrusion", Materalia 6 (2019) 100260, Netherlands, 6 pages.

Whalen et al., U.S. Appl. No. 15/694,565, filed Sep. 1, 2017, titled "System and Process for Joining Dissimilar Materials and Solid-State Interocking Joint with Intermetallic Interface Formed Thereby", 69 pages.

Abu-Farha, "A Preliminary Study on the Feasibility of Friction Stir Back Extrusion", Scripta Materials, 66, 2012, United States, 615-618.

Amancio-Filho et al., "Joining of Polymers and Polymer-Metal Hybrid Structures: Recent Developments and Trends", Polymer Engineering & Science, 2009, United States, pp. 1461-1476.

Bozzi et al., "Intermetallic Compounds in Al 6016/IF-Steel Friction Stir Spot Welds", Materials Science and Engineering, 2010, Netherlands, pp. 4505-4509.

Cole et al., "Lightweight materials for Automotive Applications", Materials Characterization, 35, 1995, United States, pp. 3-9.

Evans et al., "Friction Stir Extrusion: A new process for joining dissimilar materials", Manufacturing Letters, 5, 2015, United States, pp. 25-28.

Gann, J.A., "Magnesium Industry's Lightest Structural Metal", SAE Transactions, vol. 25-26, 1930-1931, United States, pp. 620-634, 641.

Hammond et al., "Equal-Channel Angular Extrusion of a Low-Density High-Entropy Alloy Produced by High-Energy Cryogenic Mechanical Alloying", JOM. vol. 66, No. 10, United States, 2014, pp. 2021-2029.

Kaiser et al., "Anisotropic Properties of Magnesium Sheet AZ31", Materials Science Forum, vols. 419-422, Switzerland, 2003, pp. 315-320.

Kuo et al., "Fabrication of High Performance Magnesium/Carbon-Fiber/PEEK/Laminated Composites", Materials Transactions, vol. 44, No. 8 (2003), Japan, pp. 1613-1619.

Leitao et al., "Aluminum-steel lap joining by multipass friction stir welding", Materials and Design, 106, 2016, United States, pp. 153-160.

Thomasnet.com, https:/www.thomasnet.com/articles/custom-manufacturing-fabricating/friction-stir-welding/ Feb. 10, 2011 (Year: 2011).

Trang et al., "Designing a Magnesium Alloy with High Strength and High Formability", Nature Communications, 2018, United Kingdom, 6 pages.

Liu et al., "A Review of Dissimilar Welding Techniques for Magnesium Alloys to Aluminum Alloys", Materials, 7, 2014, United States, pp. 3735-3757.

Liu et al., "Microstructure and mechanical properties of equimolar FeCoCrNi high entropy alloy prepared via powder extrusion", Intermetallics 75 (2016), United States, pp. 25-30.

Martinsen et al., "Joining of Dissimilar Materials", CIRP Annals—Manufacturing Technology, 2015, United States, 21 pages.

Office Action for U.S. Appl. No. 14/222,468, filed Mar. 21, 2014, First named inventor Curtis A. Lavender, Notification date Nov. 6, 2015, 10 pages.

Office Action for U.S. Appl. No. 14/222,468, filed Mar. 21, 2014, First named inventor Curtis A. Lavender, Notification date Apr. 1, 2016, 10 pages.

Office Action for U.S. Appl. No. 14/222,468, filed Mar. 21, 2014, First named inventor Curtis A. Lavender, Notification date May 20, 2016, 3 pages.

Office Action for U.S. Appl. No. 14/222,468, filed Mar. 21, 2014, First named inventor Curtis A. Lavender, Notification date Jan. 26, 2017, 9 pages.

Office Action for U.S. Appl. No. 14/268,220, filed May 2, 2014, First Named Inventor Jun Cui, Notification date Dec. 1, 2015, 7 pages.

Rodewald et al. "Top Nd—Fe—B Magnets with Greater Than 56 MGOe Energy Density and 9.8 kOe Coercivity", IEEE Transactions on Magnetics, vol. 38, No. 5, 2002, United States, pp. 2955-2957.

Saha, "Aluminum Extrusion Technology, Chapter 1, Fundamentals of Extrusion", The Materials Information Society, ASM International, 2000, United States, pp. 1-29.

"6323.012CA1_Examiners Rule 862 Requisition_Report_Consolidated Correspondence Jul. 20, 2023", (Jul. 20, 2023), 5 pages.

"U.S. Appl. No. 14/268,220, Office Action mailed Dec. 1, 2015", (Dec. 1, 2015), 8 pgs.

"U.S. Appl. No. 17/033,854, Advisory Action mailed Aug. 16, 2023", 4 pgs.

"U.S. Appl. No. 17/033,854, Final Office Action mailed Jun. 7, 2023", 11 pgs.

"U.S. Appl. No. 17/033,854, Response filed Aug. 7, 2023 to Final Office Action mailed Jun. 7, 2023", 9 pgs.

"U.S. Appl. No. 17/035,597, Response filed Sep. 11, 2023 to Non Final Office Action mailed Aug. 28, 2023", 61 pgs.

"U.S. Appl. No. 17/242,166, Final Office Action mailed Aug. 30, 2023", 7 pgs.

"U.S. Appl. No. 17/473,178, Advisory Action mailed Jan. 3, 2024", 3 pgs.

(56) References Cited

OTHER PUBLICATIONS

"U.S. Appl. No. 17/473,178, Final Office Action mailed Oct. 20, 2023", 9 pgs.
"U.S. Appl. No. 17/473,178, Non Final Office Action mailed Jan. 3, 2024", 10 pgs.
"U.S. Appl. No. 17/473,178, Non Final Office Action mailed Feb. 8, 2023", 22 pgs.
"U.S. Appl. No. 17/473,178, Response filed Jul. 10, 2023 to Non Final Office Action mailed Feb. 8, 2023", 13 pgs.
"U.S. Appl. No. 17/473,178, Response filed Dec. 20, 2023 to Final Office Action mailed Oct. 20, 2023", 11 pgs.
"U.S. Appl. No. 17/826,054, Preliminary Amendment filed Jul. 13, 2023", 9 pgs.
"U.S. Appl. No. 18/093,636, Restriction Requirement mailed Dec. 20, 2023", 6 pgs.
"U.S. Appl. No. 14/222,468, Non Final Offce Action mailed Nov. 6, 2015", (Nov. 6, 2015), 11 pgs.
"CA App 3105375 Examiner Req 86 2 mailed Dec. 28, 2023", 7 pages.
"CA Application 3155420 Examiners Rule mailed May 11, 2023", (May 11, 2023), 4 pages.
"Canadian Application Serial No. 3,192,375, Voluntary Amendment filed Dec. 28, 2023", 59 pgs.
"Chinese Application Serial No. 202180062766.0, Voluntary Amendment filed Nov. 13, 2023", w/o English claims, 89 pgs.
"Chinese Application Serial No. 202311192831.9, Response filed Dec. 28, 2023 to Notification to Make Rectification issued Nov. 1, 2023", w/current English claims, 21 pgs.
"CN 201980045070X Office Action mailed Sep. 6, 2022", with English translation, 13 pages.
"CN 201980045070X Response mailed Apr. 11, 2023 to Office Action Sep. 6, 2022", with English claims, 8 pages.
"EP 20869757 Extended European Search Report mailed Sep. 19, 2023", 10 pages.
"European Application Serial No. 19745460.6, Communication Pursuant to Article 94(3) EPC mailed May 10, 2023", 6 pgs.
"European Application Serial No. 19745460.6, Response filed Sep. 18, 2023 to Communication Pursuant to Article 94(3) EPC mailed May 10, 2023", 9 pgs.
"European Application Serial No. 19745460.6, Summons to attend oral proceedings pursuant to Rule 115(1) EPC mailed Jan. 4, 2024", 6 pgs.
"European Application Serial No. 21867741.7, Response to Communication Pursuant to Rules 161 & 162 EPC filed Oct. 16, 2023", 15 pgs.
"International Application Serial No. PCT/US2019/040730, International Preliminary Report on Patentability mailed Jan. 5, 2021", (Jan. 5, 2021), 8 pages.
"International Application Serial No. PCT/US2019/040730, International Search Report mailed Oct. 21, 2019", (Oct. 21, 2019), 4 pages.
"International Application Serial No. PCT/US2019/040730, Written Opinion mailed Oct. 21, 2019", (Oct. 21, 2019), 7 pages.
"International Application Serial No. PCT/US2020/053168, International Preliminary Report on Patentability mailed Apr. 7, 2022", (Apr. 7, 2022), 8 pages.
"International Application Serial No. PCT/US2020/05168 International Search Report mailed Feb. 8, 2021 ", (Feb. 8, 2021), 5 pages.
"International Application Serial No. PCT/US2020/05168 Written Opinion mailed Feb. 8. 2021", (Feb. 8, 2021), 6 pages.
U.S. Appl. No. 14/222,468, filed Mar. 21, 2014, System and Process for Formation of Extrusion Structures.
U.S. Appl. No. 15/351,201 U.S. Pat. No. 10,189,063, filed Nov. 14, 2016, System and Process for Formation of Extrusion Products.
U.S. Appl. No. 62/460,227, filed Feb. 17, 2017, Functionally Graded Coatings and Claddings.
U.S. Appl. No. 15/898,515 U.S. Pat. No. 10,695,811, filed Feb. 17, 2018, Functionally Graded Coatings and Claddings.
U.S. Appl. No. 17/984,144, filed Nov. 9, 2022, Functionally Graded Coatings and Claddings.
U.S. Appl. No. 16/916,548 U.S. Pat. No. 11,517,952, filed Jun. 30, 2020, Shear Assisted Extrusion Process.
U.S. Appl. No. 16/028,173 U.S. Pat. No. 11,045,851, filed Jul. 5, 2018, Method for Forming Hollow Profile Non-Circular Extrusions Using Shear Assisted Processing and Extrusion (Shape).
U.S. Appl. No. 17/175,464 U.S. Pat. No. 11,534,811, filed Feb. 12, 2021, Method for Forming Hollow Profile Non-Circular Extrusions Using Shear Assisted Processing and Extrusion (Shape).
U.S. Appl. No. 17/985,611, filed Nov. 11, 2022, Method for Forming Hollow Profile Non-Circular Extrusions Using Shear Assisted Processing and Extrusion (Shape).
U.S. Appl. No. 16/562,314 U.S. Pat. No. 11,383,280, filed Sep. 5, 2019, Devices and Methods for Performing Shear-Assisted Extrusion, Extrusion Feedstocks, Extrusion Processes, and Methods for Preparing Metal Sheets.
U.S. Appl. No. 17/826,054, filed May 26, 2022, Devices and Methods for Performing Shear-Assisted Extrusion, Extrusion Feedstocks, Extrusion Processes, and Methods for Preparing Metal Sheets.
U.S. Appl. No. 17/665,433 U.S. Pat. No. 11,684,959, filed Feb. 4, 2022, Extrusion Processes for Forming Extrusions of a Desired Composition From a Feedstock.
U.S. Appl. No. 17/033,854, filed Sep. 27, 2020, Devices and Methods for Performing Shear-Assisted Extrusion and Extrusion Processes.
U.S. Appl. No. 17/874,140, filed Jul. 26, 2022, Devices and Methods for Performing Shear-Assisted Extrusion and Extrusion Processes.
U.S. Appl. No. 17/242,166, filed Apr. 27, 2021, Devices and Methods for Performing Shear-Assisted Extrusion and Extrusion Processes.
U.S. Appl. No. 17/957,207, filed Sep. 30, 2022, Devices and Methods for Performing Shear-Assisted Extrusion and Extrusion Processes.
U.S. Appl. No. 18/426,042, filed Jan. 29, 2024, Devices and Methods for Performing Shear-Assisted Extrusion and Extrusion Processes.
U.S. Appl. No. 17/473,178, filed Sep. 13, 2021, Devices and Methods for Performing Shear-Assisted Extrusion and Extrusion Processes.
U.S. Appl. No. 18/093,636, filed Jan. 5, 2023, Devices and Methods for Performing Shear-Assisted Extrusion and Extrusion Processes.
U.S. Appl. No. 18/121,563, filed Mar. 14, 2023, Extrusion Prcesses, Feedstock Materials, Conductive Materials and/or Assemblies.
"U.S. Appl. No. 17/033,854, Advisory Action mailed Jun. 5, 2024", 4 pgs.
"U.S. Appl. No. 17/033,854, Examiner Interview Summary mailed Jul. 30, 2024", 3 pgs.
"U.S. Appl. No. 17/033,854, Response filed May 28, 2024 to Final Office Action mailed Mar. 28, 2024", 13 pgs.
"U.S. Appl. No. 17/957,207, Final Office Action mailed Jun. 12, 2024", 13 pgs.
"U.S. Appl. No. 17/473,178, Final Office Action mailed Jun. 14, 2024", 21 pgs.
"U.S. Appl. No. 17/473,178, Non Final Office Action mailed Feb. 28, 2024", 19 pgs.
"U.S. Appl. No. 17/473,178, Response filed May 28, 2024 to Non Final Office Action mailed Feb. 28, 2024", 10 pgs.
"U.S. Appl. No. 17/826,054, Examiner Interview Summary mailed Jul. 30, 2024", 3 pgs.
"U.S. Appl. No. 18/093,636, Non Final Office Action mailed Jun. 14, 2024", 14 pgs.
"Canadian Application Serial No. 3,105,375, Response filed Apr. 26, 2024 to Examiners Rule 86 2 Requisition mailed Dec. 28, 2023", 27 pgs.
"Canadian Application Serial No. 3,155,420, Examiners Rule 862 Requisition Report Apr. 18, 2024", 3 pgs.
"European Application Serial No. 19745460.6, Response filed Jun. 20, 2024 to Summons to attend oral proceedings pursuant to Rule 115(1) EPC mailed Jan. 4, 2024", 12 pgs.
"European Application Serial No. 20869757, Response filed Apr. 12, 2024 to Extended European Search Report mailed Sep. 19, 2023", 13 pgs.

(56) References Cited

OTHER PUBLICATIONS

"European Application Serial No. 21867741.7, Extended European Search Report mailed Aug. 12, 2024", 8 pgs.
"U.S. Appl. No. 17/033,854, Non Final Office Action mailed Oct. 4, 2023", 11 pgs.
"U.S. Appl. No. 17/033,854, Response filed Mar. 7, 2024 to Non Final Office Action mailed Oct. 4, 2023", 10 pgs.
"U.S. Appl. No. 17/826,054, Non Final Office Action mailed Mar. 8, 2024", 13 pgs.
"U.S. Appl. No. 17/874,140, Non Final Office Action mailed Mar. 20, 2024", 10 pgs.
"U.S. Appl. No. 17/985,611, Non Final Office Action mailed Mar. 27, 2024", 10 pgs.
"U.S. Appl. No. 17/033,854, Final Office Action mailed Mar. 28, 2024", 12 pgs.
"U.S. Appl. No. 17/984,144, Non Final Office Action mailed Mar. 29, 2024", 14 pgs.
"U.S. Appl. No. 18/093,636, Response filed Apr. 5, 2024 to Restriction Requirement mailed Dec. 20, 2023", 6 pgs.
"U.S. Appl. No. 17/473,178, Response filed Apr. 11, 2024 to Non Final Office Action mailed Jan. 3, 2024", 8 pgs.
"U.S. Appl. No. 17/033,854, Notice of Allowance mailed Sep. 20, 2024", 16 pgs.
"U.S. Appl. No. 17/033,854, Response filed Aug. 23, 2024 to Advisory Action mailed Jun. 5, 2024", 17 pgs.
"U.S. Appl. No. 17/473,178, Advisory Action mailed Oct. 31, 2024", 3 pgs.
"U.S. Appl. No. 17/473,178, Examiner Interview Summary mailed Oct. 16, 2024", 3 pgs.
"U.S. Appl. No. 17/473,178, Notice of Allowance mailde Nov. 25, 2024", 8 pgs.
"U.S. Appl. No. 17/473,178, Response filed Oct. 14, 2024 to Final Office Action mailed Jun. 14, 2024", 14 pgs.
"U.S. Appl. No. 17/473,178, Response filed Nov. 8, 2024 to Advisory Action mailed Oct. 31, 2024 & Final Office Action Jun. 14, 2024", 14 pgs.
"U.S. Appl. No. 17/826,054, Final Office Action mailed Oct. 18, 2024", 14 pgs.
"U.S. Appl. No. 17/826,054, Response filed Jan. 6, 2025 to Final Office Action mailed Oct. 18, 2024", 9 pgs.
"U.S. Appl. No. 17/826,054, Response filed Aug. 8, 2024 to Non Final Office Action mailed Mar. 8, 2024", 13 pgs.
"U.S. Appl. No. 17/874,140, Final Office Action mailed Nov. 15, 2024", 11 pgs.
"U.S. Appl. No. 17/874,140, Response filed Sep. 16, 2024 to Non Final Office Action mailed Mar. 20, 2024", 15 pgs.
"U.S. Appl. No. 17/957,207, Advisory Action mailed Oct. 31, 2024", 3 pgs.
"U.S. Appl. No. 17/957,207, Notice of Allowance mailed Nov. 22, 2024", 9 pgs.
"U.S. Appl. No. 17/957,207, Response filed Oct. 14, 2024 to Final Office Action mailed Jun. 12, 2024", 14 pgs.
"U.S. Appl. No. 17/957,207, Response filed Nov. 8, 2024 to Advisory Action mailed Oct. 31, 2024 & Final Office Action mailed Jun. 12, 2024", 16 pgs.
"U.S. Appl. No. 17/984,144, Notice of Allowance mailed Nov. 26, 2024", 11 pgs.
"U.S. Appl. No. 17/984,144, Response filed Sep. 17, 2024 to Non Final Office Action mailed Mar. 29, 2024", 8 pgs.
"U.S. Appl. No. 17/985,611, Final Office Action mailed Dec. 5, 2024", 15 pgs.
"U.S. Appl. No. 17/985,611, Response filed Sep. 17, 2024 to Non Final Office Action mailed Mar. 27, 2024", 12 pgs.
"U.S. Appl. No. 18/093,636, Final Office Action mailed Jan. 13, 2025", 12 pgs.
"U.S. Appl. No. 18/093,636, Response filed Oct. 14, 2024 to Non Final Office Action mailed Jun. 14, 2024", 14 pgs.
"Application Serial No. PCT/US2023/015228, IPRP mailed Sep. 26, 2024", 11 pgs.
"Canadian Application Serial No. 3,105,375, Examiners Rule 86(2) Report mailed Nov. 6, 2024", 9 pgs.
"Canadian Application Serial No. 3,155,420, Response filed Aug. 13, 2024 to Examiners Rule 862 Requisition Report Apr. 18, 2024", 10 pgs.
"European Application Serial No. 20869757.3, Communication Pursuant to Article 94(3) EPC mailed Sep. 4, 2024", 6 pgs.
"European Application Serial No. 20869757.3, Response filed Jan. 3, 2025 to Communication Pursuant to Article 94(3) EPC mailed Sep. 4, 2024", 10 pgs.
"JP 2004-174563 Translation from FIT database", (Year: 2024), 22 pgs.
"JP-2002361320-A Translation provided by FIT database", (Year: 2025), 9 pgs.
X, Li, et al., "CN-105925846-B translation provided by FIT database (Year: 2024)", Feb. 23, 2018), 12 pgs.
"U.S. Appl. No. 17/826,054, Notice of Allowance mailed Feb. 26, 2025", 10 pgs.
"Canadian Application Serial No. 3,105,375, Response filed Mar. 3, 2025 to Examiners Rule 86(2) Report mailed Nov. 6, 2024", 7 pgs.
"European Application Serial No. 25156776.4, Response filed Mar. 20, 2025 to Invitation to Remedy Deficiencies (R. 58 EPC) mailed Feb. 20, 2025", 8 pgs.
"U.S. Appl. No. 17/985,611, Response filed Apr. 7, 2025 to Final Office Action mailed Dec. 5, 2024", 9 pgs.
"U.S. Appl. No. 17/984,144, Notice of Allowance mailed Mar. 27, 2025", 11 pgs.
"U.S. Appl. No. 17/473,178, Notice of Allowance mailed Mar. 28, 2025", 12 pgs.
"U.S. Appl. No. 18/093,636, Response filed Apr. 14, 2025 to Final Office Action mailed Jan. 13, 2025", 9 pgs.
"U.S. Appl. No. 17/874,140, Response filed Apr. 15, 2025 to Final Office Action mailed Nov. 15, 2024", 8 pgs.

* cited by examiner

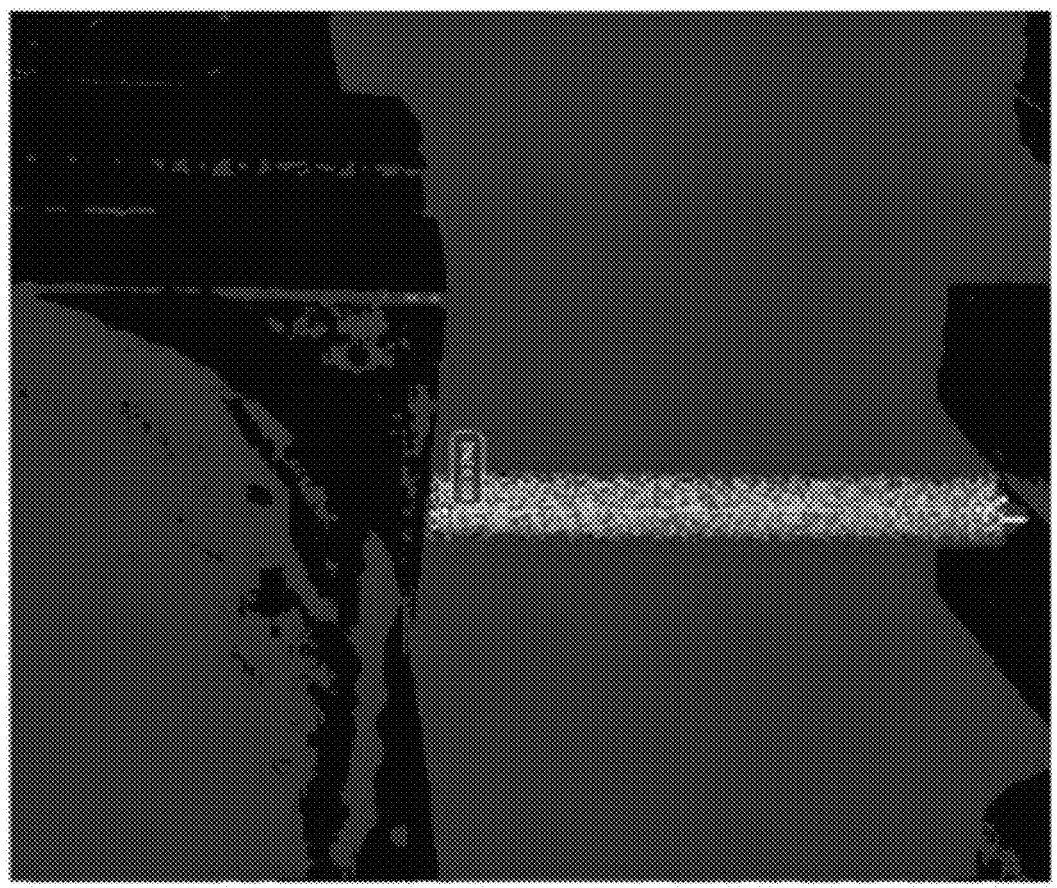
FIG. 33

SHAPE PROCESSES, FEEDSTOCK MATERIALS, CONDUCTIVE MATERIALS AND/OR ASSEMBLIES

CROSS REFERENCE TO RELATED APPLICATION

This application claims priority to and the benefit of U.S. Provisional Application Ser. No. 62/906,911 filed Sep. 27, 2019, the contents of which are hereby incorporated by reference. This application is a Continuation-In-Part of and claims priority to U.S. patent application Ser. No. 16/562,314 filed Sep. 5, 2019, which is a Continuation-In-Part of and claims priority to U.S. patent application Ser. No. 16/028,173 filed Jul. 5, 2018, which is a Continuation-in-Part of and claims priority to U.S. patent application Ser. No. 15/898,515 filed Feb. 17, 2018, now U.S. Pat. No. 10,695,811 issued Jun. 30, 2020, which is a Continuation-in-Part and claims priority and the benefit of both U.S. Provisional Application Ser. No. 62/460,227 filed Feb. 17, 2017 and U.S. patent application Ser. No. 15/351,201 filed Nov. 14, 2016, now U.S. Pat. No. 10,189,063 issued Jan. 29, 2019, which is a Continuation-in-Part and claims priority and the benefit of both U.S. Provisional Application Ser. No. 62/313,500 filed Mar. 25, 2016 and U.S. patent application Ser. No. 14/222,468 filed Mar. 21, 2014, which claims priority to and the benefit of U.S. Provisional Application Ser. No. 61/804,560 filed Mar. 22, 2013; the contents of all of the foregoing are hereby incorporated by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to metals technology in general, but more specifically to extrusion and technology.

BACKGROUND

Increased needs for fuel efficiency in transportation coupled with ever increasing needs for safety and regulatory compliance have focused attention on the development and utilization of new materials and processes. In many instances, impediments to materials entry into these areas have been caused by the lack of effective and efficient manufacturing methods. For example, the ability to replace steel car parts with materials made from magnesium or aluminum or their associated alloys is of great interest. Additionally, the ability to form hollow parts with equal or greater strength than solid parts is an additional desired end. Previous attempts have failed or are subject to limitations based upon a variety of factors, including the lack of suitable manufacturing process, the expense of using rare earths in alloys to impart desired characteristics, and the high energy costs for production.

What is needed is a process and device that enables the production of items such as components in automobile or aerospace vehicles with hollow cross sections that are made from materials such as magnesium or aluminum with or without the inclusion of rare earth metals. What is also needed is a process and system for production of such items that is more energy efficient, capable of simpler implementation, and produces a material having desired grain sizes, structure and alignment so as to preserve strength and provide sufficient corrosion resistance. What is also needed is a simplified process that enables the formation of such structures directly from billets, powders or flakes of material without the need for additional processing steps. What is also needed is a new method for forming high entropy alloy materials that is simpler and more effective than current processes. The present disclosure provides a description of significant advances in meeting these needs.

Over the past several years researchers at the Pacific Northwest National Laboratory have developed a novel Shear Assisted Processing and Extrusion (ShAPE) technique which uses a rotating ram or die rather than a simply axially fed ram or die as is used in the conventional extrusion process. As described hereafter as well as in the in the previously cited, referenced, and incorporated patent applications, this process and its associated devices provide a number of significant advantages including reduced power consumption, better material properties and enables a whole new set of "solid phase" types of forming process and machinery. Deployment of the advantages of these processes and devices are envisioned in a variety of industries and applications including but not limited to transportation, projectiles, high temperature applications, structural applications, nuclear applications, and corrosion resistance applications.

Various additional advantages and novel features of the present invention are described herein and will become further readily apparent to those skilled in this art from the following detailed description. In the preceding and following descriptions we have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

Specific problems have hampered the metallurgic industry, for example, joining magnesium to aluminum can be troublesome because of the formation of brittle, $Mg_{17}Al_{12}$, intermetallics (IMC) at the dissimilar interface. Conventional welding such as tungsten inert gas [1], electron beam [2], laser [3], resistance spot [4] and compound casting [5] are notorious for thick, brittle, $Mg_{17}Al_{12}$ interfacial layers since both the Mg and Al go through melting and solidification.

In an effort to reduce the deleterious effects of $Mg_{17}Al_{12}$, many techniques have been employed. For example, diffusion bonding, ultrasonic spot welding, electrical discharge riveting, and friction stir approaches. Friction stir welding (FSW), and its many derivatives, has received some attention, but researches have yet to adequately address the fundamental problem of forming brittle $Mg_{17}Al_{12}$ interfacial layers at the dissimilar interface.

Additionally, certain very useful materials such as Mg materials can have an increased use if cost was less of a barrier. For example, in the automotive industry, cost is the first major barrier for using Mg sheet materials. Unlike aluminum and steel, Mg alloys cannot be hot-rolled easily in the as-cast condition due to a propensity for cracking. As such, Mg alloys are typically rolled by twin roll casting process or use a multi-step hot rolling, making the sheet forming process expensive. Cold rolling is even more susceptible to cracking and is therefore limited to small reduction ratios (i.e. low throughput), which also makes the process slow and costly.

In the field of energy conversion and energy transport, there is a need to develop materials (alloys, composites, etc.) with improved electrical performance, specifically higher electrical conductivity and current density, compared to market alternatives. Currently, parts used for electrical applications such as in overhead conductors, motors, inverters, and generators are developed using copper and aluminum typically. These alloys (such as C10100, C11000, C15000, AA1100, AA1350, AA8002) are designed to have minimal impurities, but occasionally include additives that improve mechanical performance, wear resistance, and corrosion resistance of the metal substrates but do so sacrificing conductivity. This is because conventionally, introducing additives in a metal increases charge scattering leading to detrimental carrier transport properties. There is a critical gap in technology where additives are introduced in metals to make alloys or composites for the purpose of improving electrical performance.

SUMMARY

Shear assisted extrusion processes (ShAPE) for forming Metal-NCCF extrusions are provided. The processes can include: using a die tool, applying a rotational shearing force and an axial extrusion force to a feedstock material comprising a metal and NCCF (NanoCrystalline Carbon Forms); and extruding a mixture comprising the metal and NCCF through an opening in the die tool to form the Metal-NCCF extrusion.

ShAPE feedstock materials are provided that can include a metal and NCCF.

Solid material mixtures are provided that can include: a metal and/or a combination of metals; and a NCCF that may include one or more of carbon forms such as carbon nanotubes, graphene, nano-graphite, buckyballs, crystalline carbon particles, carbon quantum dots, and nano-diamond. Portions of the metals and NCCF of the material mixtures can have a preferred crystallographic orientation or an isotropic crystallographic orientation.

Assemblies relying in part on conductivity can include: a conductive solid material mixture that includes: a metal; and a NCCF. The metal precursors or feedstock used to manufacture the metal-NCCF ShAPE extrudates can be in the form of chips, particles, powders, films, foils, nuggets, discs, or solid billets, for example.

The present description provides examples of shear-assisted extrusion processes for forming non-circular hollow-profile extrusions of a desired composition from feedstock material, for example. At a high-level this is accomplished by simultaneously applying a rotational shearing force and an axial extrusion force to the same location on the feedstock material using a scroll face with a plurality of grooves defined therein. These grooves are configured to direct plasticized material from a first location, typically on the interface between the material and the scroll face, through a portal defined within the scroll face to a second location, typically upon a die bearing surface. At this location the separated streams of plasticized material are recombined and reconfigured into a desired shape having the preselected characteristics.

In some applications the scroll face has multiple portals, each portal configured to direct plasticized material through the scroll face and to recombine at a desired location either unified or separate. In the particular application described the scroll face has two sets of grooves, one set to direct material from the outside in and another configured to direct material from the inside out. In some instances a third set of grooves circumvolves the scroll face to contain the material and prevent outward flashing.

This process provides a number of advantages including the ability to form materials with better strength, electrical conductivity and corrosion resistance and minimal porosity characteristics at lower temperatures, lower forces, and with significantly lower extrusion force and electrical power than required by other processes.

For example in one instance the extrusion of the plasticized material is performed at a die face temperature less than 150° C. In other instances the axial extrusion force is at or below 50 MPa. In one particular instance a magnesium alloy in billet form was extruded into a desired form in an arrangement wherein the axial extrusion force is at or below 25 MPa, and the temperature is less than 100° C. While these examples are provided for illustrative reasons, it is to be distinctly understood that the present description also contemplates a variety of alternative configurations and alternative embodiments.

Another advantage of the presently disclosed embodiment is the ability to produce high quality extruded materials from a wide variety of starting materials including, billets, flakes powders, etc. without the need for additional pre or post processing to obtain the desired results. In addition to the process, the present disclosure also provides exemplary descriptions of a device for performing shear assisted extrusion. In one configuration this device has a scroll face configured to apply a rotational shearing force and an axial extrusion force to the same preselected location on material wherein a combination of the rotational shearing force and the axial extrusion force upon the same location cause a portion of the material to plasticize. The scroll face further has at least one groove and a portal defined within the scroll face. The groove is configured to direct the flow of plasticized material from a first location (typically on the face of the scroll) through the portal to a second location (typically on the back side of the scroll and in some place along a mandrel that has a die bearing surface) wherein the plasticized material recombines after passage through the scroll face to form an extruded material having preselected features at or near these second locations.

This process provides for a significant number of advantages and industrial applications. For example, this technology enables the extrusion of metal wires, bars, and tubes used for vehicle components with 50 to 100 percent greater ductility and energy absorption over conventional extrusion technologies, while dramatically reducing manufacturing costs; this while being performed on smaller and less expensive machinery than what is used in conventional extrusion equipment. Furthermore, this process yields extrusions from lightweight materials like magnesium and aluminum alloys with improved mechanical properties that are impossible to achieve using conventional extrusion, and can go directly from powder, flake, or billets in just one single step, which dramatically reduces the overall energy consumption and process time compared to conventional extrusion. Additionally, this process produces copper based wires and rods that are 4-5 percent more electrically conductive than annealed copper at 20-300 degrees Celsius.

Applications of the present process and device could, for example, be used to form parts for the front end of an automobile wherein it is predicted that a 30 percent weight savings can be achieved by replacing aluminum components with lighter-weight magnesium, and a 75 percent weight savings can be achieved by replacing steel with magnesium. Typically processing into such embodiments have required the use of rare earth elements into the magnesium alloys to achieve properties suitable for structural energy absorption applications. However, these rare earth elements are expensive and rare and in many instances are found in areas of difficult circumstances, making magnesium extrusions too expensive for all but the most exotic vehicles. As a result, less than 1 percent of the weight of a typical passenger vehicle comes from magnesium. The processes and devices described hereafter, however, enable the use of non-rare earth magnesium alloys to achieve comparable results as those alloys that use the rare earth materials. This results in additional cost saving in addition to a tenfold reduction in power consumption—attributed to significantly less force required to produce the extrusions—and smaller machinery footprint requirements.

As a result the present technology could find ready adaptation in the making of lightweight magnesium components for automobiles such as front end bumper beams and crush cans. In addition to the automobile, deployments of the present invention can drive further innovation and development in a variety of industries such as aerospace, electric power industry, semiconductors and more. For example, this technique could be used to produce creep-resistant steels for heat exchangers in the electric power industry, and high-conductivity copper and advanced magnets for electric motors. It has also been used to produce high-strength aluminum rods for the aerospace industry, with the rods extruded in one single step, directly from powder, with twice the ductility compared to conventional extrusion. In addition, the solid-state cooling industry is investigating the use of these methods to produce semiconducting thermoelectric materials. As an additional example, this technique produces metal-NCCF composites that are more conductive than annealed copper, and when used in place of standard copper wiring in motor manufacturing may improve motor efficiency by 1-3 percent.

The process of the present disclosure allows precise control over various features such as grain size and crystallographic orientation—characteristics that determine the mechanical and electrical properties of extrusions, like strength, ductility, energy absorbency, and electrical conductivity. The technology produces a grain size for magnesium and aluminum alloys at an ultra-fine regime (<1 micron), representing a 10 to 100 times reduction compared to the starting material. In magnesium, the crystallographic orientation can be aligned away from the extrusion direction, which is what gives the material such high energy absorption by eliminating anisotropy between tensile and compressive strengths. A shift of 45 degrees has been achieved, which is ideal for maximizing energy absorption in magnesium alloys. Control over grain refinement and crystallographic orientation is gained through adjustments to the geometry of the spiral groove, the spinning speed of the die, the amount of frictional heat generated at the material-die interface, and the amount of force used to push the material through the die.

In addition, this extrusion process allows industrial-scale production of materials with tailored structural and electrical characteristics. Unlike severe plastic deformation techniques that are only capable of bench-scale products, ShAPE is scalable to industrial production rates, lengths, and geometries. In addition to control of the grain size, an additional layer of microstructural control has been demonstrated where grain size and texture can be tailored through the wall thickness of tubing—important because mechanical properties can now be optimized for extrusions depending on whether the final application experiences tension, compression, or hydrostatic pressure. This could make automotive components more resistant to failure during collisions while using much less material. ShAPE can also enhance textural match between NCCF additive in metal substrates which possibly decreasing their interfacial gap to improve the material's overall electrical performance.

The process's combination of linear and rotational shearing results in 10 to 50 times lower extrusion force compared to conventional extrusion. This means that the size of hydraulic ram, supporting components, mechanical structure, and overall footprint can be scaled down dramatically compared to conventional extrusion equipment—enabling substantially smaller production machinery, lowering capital expenditures and operations costs. This process generates all the heat necessary for producing extrusions via friction at the interface between the system's billet and scroll-faced die and from plastic shear deformation within the extruding material, thus not requiring the pre-heating and external heating used by other methods. This results in dramatically reduced power consumption; for example, the 11 KW of electrical power used to produce a 2-inch diameter magnesium tube takes the same amount of power to operate a residential kitchen oven—a ten- to twenty-fold decrease in power consumption compared to conventional extrusion. Extrusion ratios up to 200:1 have been demonstrated for magnesium alloys using the described process compared to 50:1 for conventional extrusion, which means fewer to no repeat passes of the material through the machinery are needed to achieve the final extrusion diameter—leading to lower production costs compared to conventional extrusion.

Finally, studies have shown a 10 times decrease in corrosion rate for extruded non-rare earth ZK60 magnesium performed under this process compared to conventionally extruded ZK60. This is due to the highly refined grain size and ability to break down, evenly distribute—and even dissolve—second-phase particles that typically act as corrosion initiation sites. The instant process has also been used to clad magnesium extrusions with aluminum coating in order to reduce corrosion.

Shear-assisted extrusion processes for forming extrusions of a desired composition from feedstock materials are also provided. The processes can include applying a rotational shearing force and an axial extrusion to the same location on the feedstock material using a scroll having a scroll face. The scroll face can have an inner diameter portion bounded by an outer diameter portion, and a member extending from the inner diameter portion beyond a surface of the outer diameter portion.

Devices for performing shear assisted extrusion are also provided. The devices can include a scroll having a scroll face having in inner diameter portion bounded by an outer diameter portion, and a member extending from the inner diameter portion beyond a surface of the outer diameter portion.

Extrusion processes for forming extrusion of a desired composition from feedstock materials is also provided. The processes can include: providing feedstock for extrusion, with the feedstock comprising at least two different materials. The process can include engaging the materials with one another within a feedstock container, with the engaging defining an interface between the two different materials. The process can continue by extruding the engaged feedstock materials to form an extruded product comprising a first portion comprising one of the two materials bound to a second portion comprising the other of the two materials. In accordance with example implementations, with extensive refinement, it has been shown that billet made from castings can be extruded, in a single step, into high performance extrusions.

Extrusion feedstock materials are also provided that can include interlocked billets of feedstock materials. These interlocked billets can be used for joining dissimilar materials and alloys, for example.

Methods for preparing metal sheets are also provided. The methods can include: preparing a metal tube via shear assisted processing and extrusion; opening the metal tube to form a sheet having a first thickness; and rolling the sheet to a second thickness that is less than the first thickness.

Various advantages and novel features of the present disclosure are described herein and will become further readily apparent to those skilled in this art from the following detailed description. In the preceding and following descriptions exemplary embodiments of the disclosure have been provided by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

Figure 15:
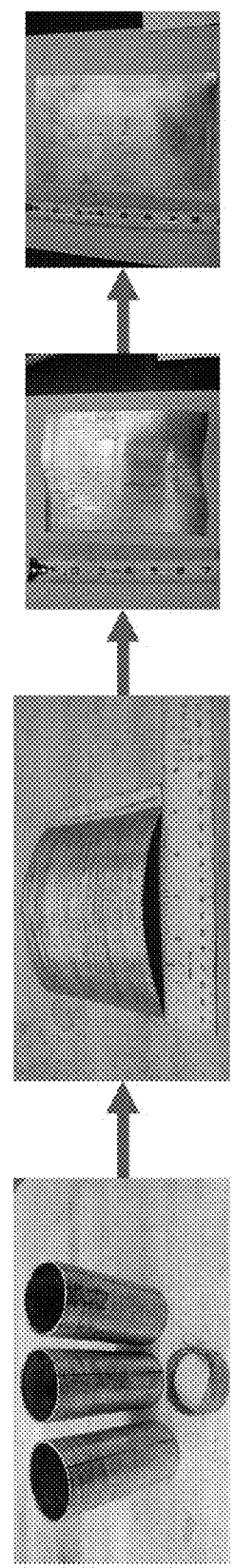

FIG. 15 demonstrates the process steps for preparing an extruded fabricated tube, the open tube, and the rolling of the tube according to an embodiment of the disclosure.

Figure 16A:
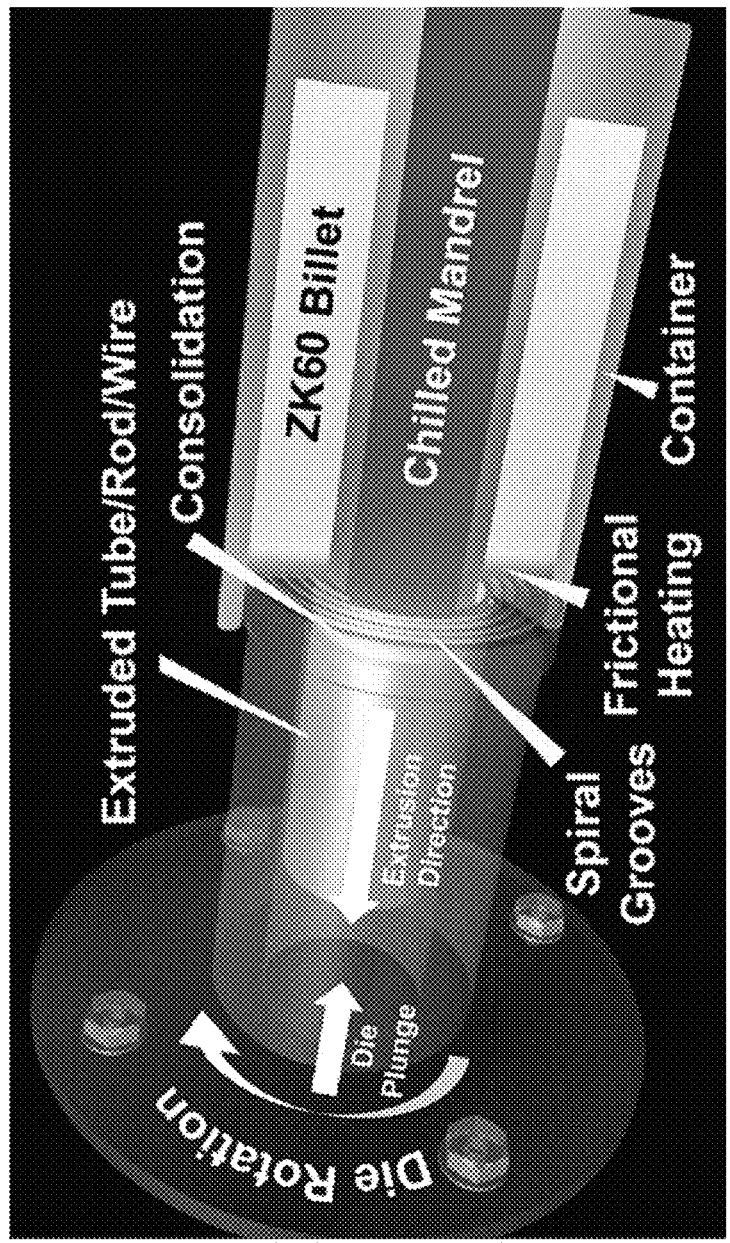
Figure 16B:
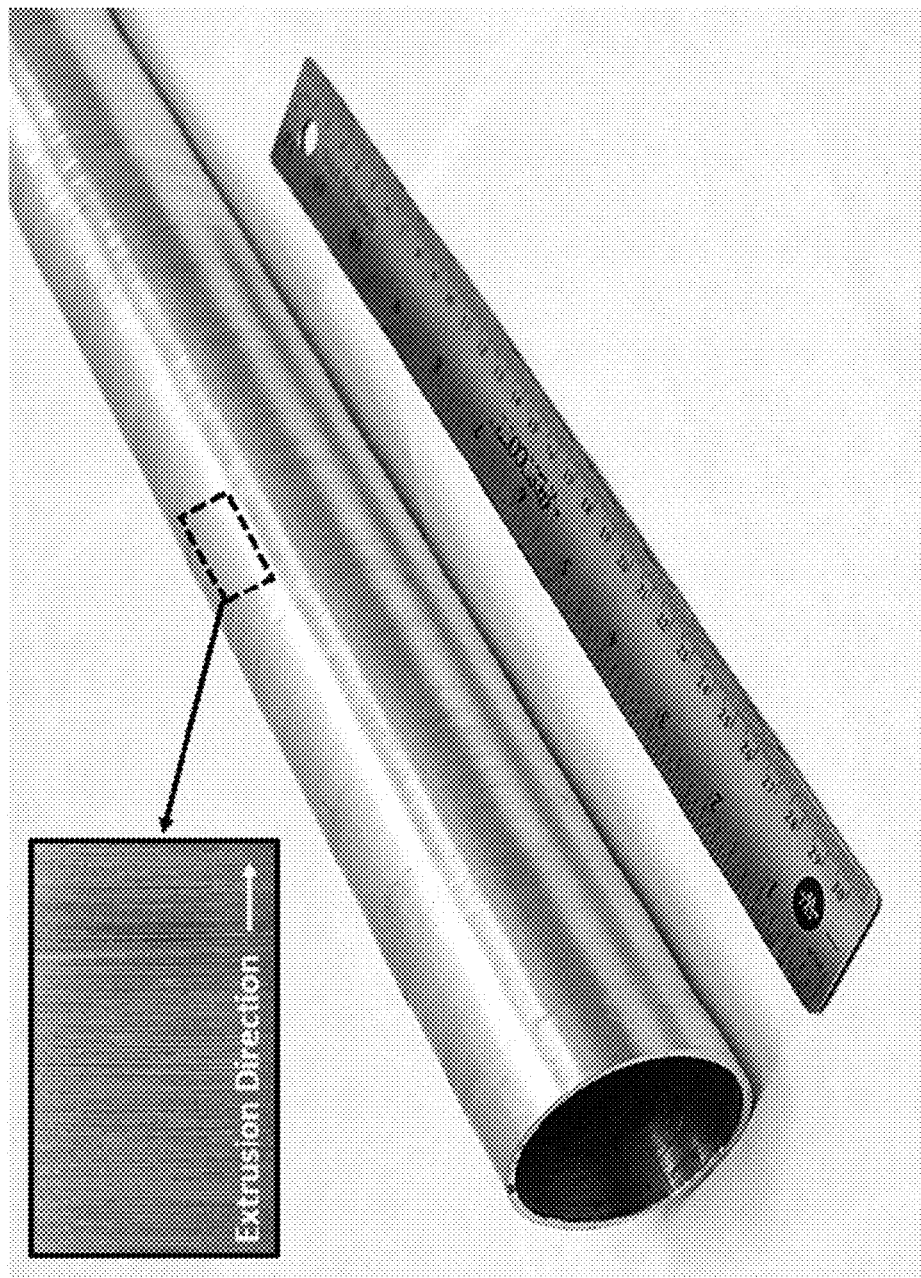

FIGS. 16A and 16B depict an example extrusion assembly according to an embodiment of the disclosure as well as example extruded material according to an embodiment of the disclosure.

Figure 17:
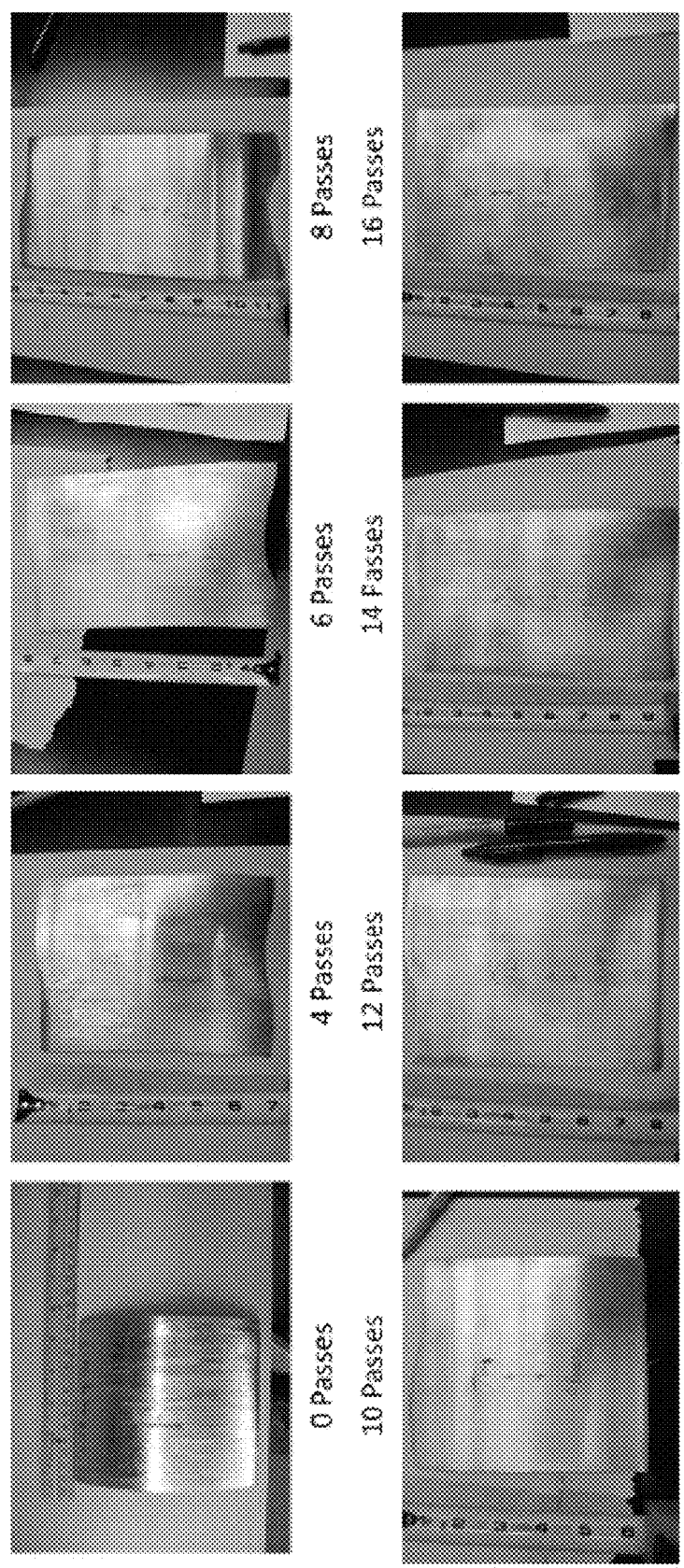

FIG. 17 demonstrates the process steps for preparing a metal sheet through to 16 passes according to an embodiment of the disclosure.

Figure 18:
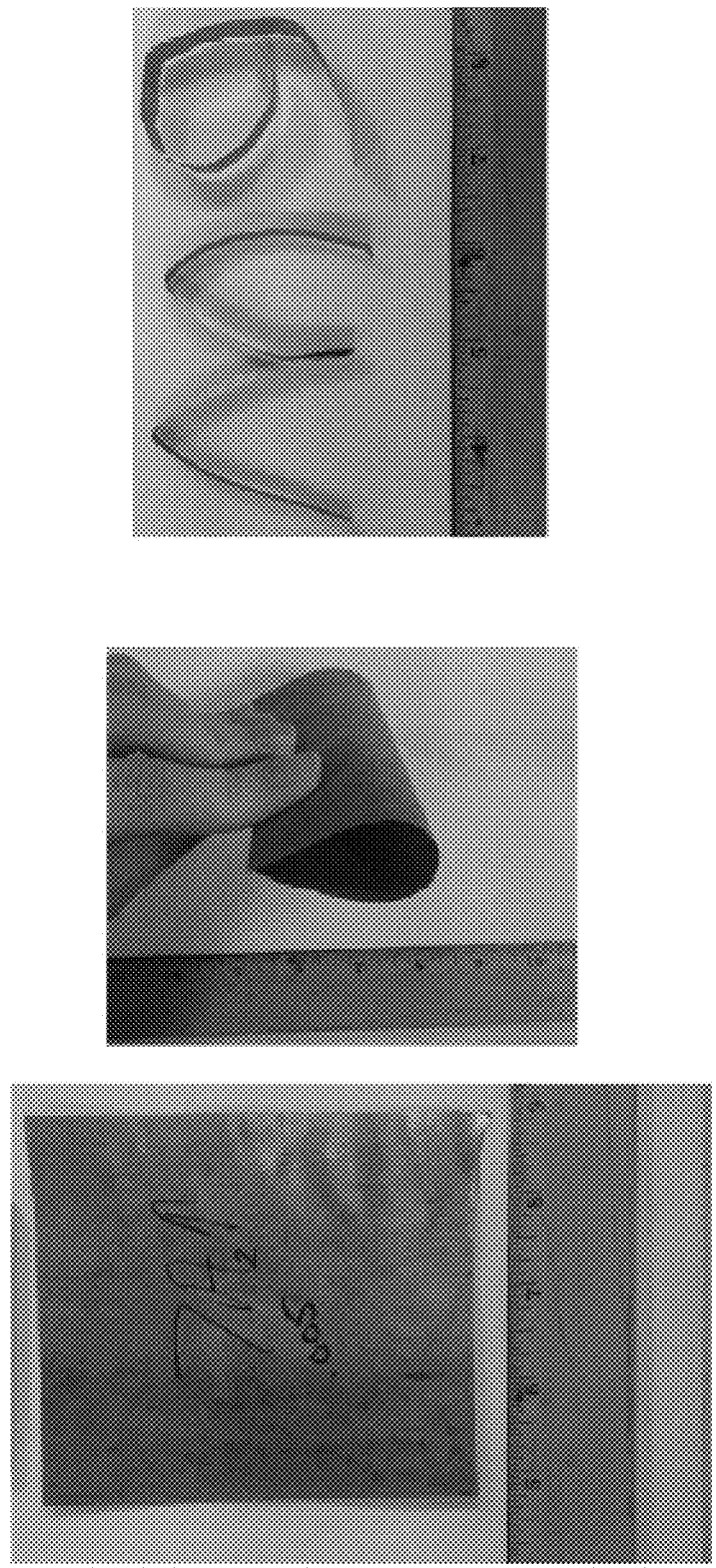

FIG. 18 demonstrates a 0.005 inch thick sheet in various configurations according to an embodiment of the disclosure.

Figure 19:
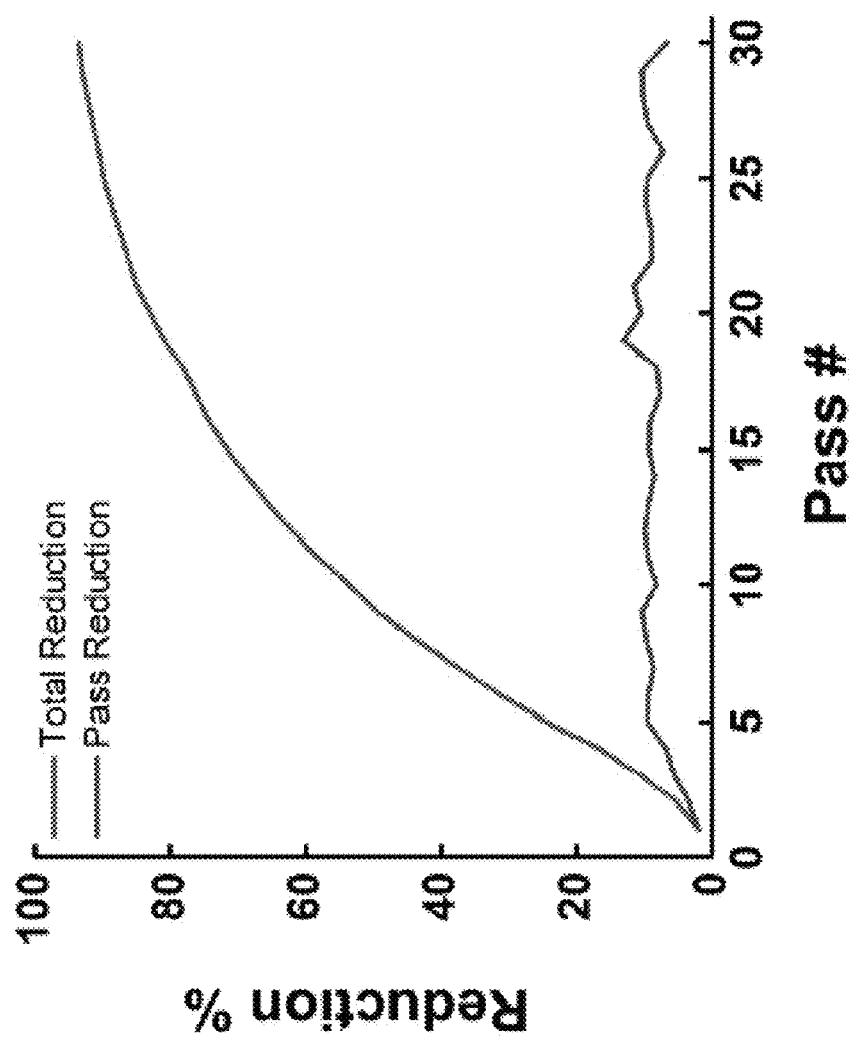

FIG. 19 shows reduction per rolling pass according to an embodiment of the disclosure.

Figure 20:
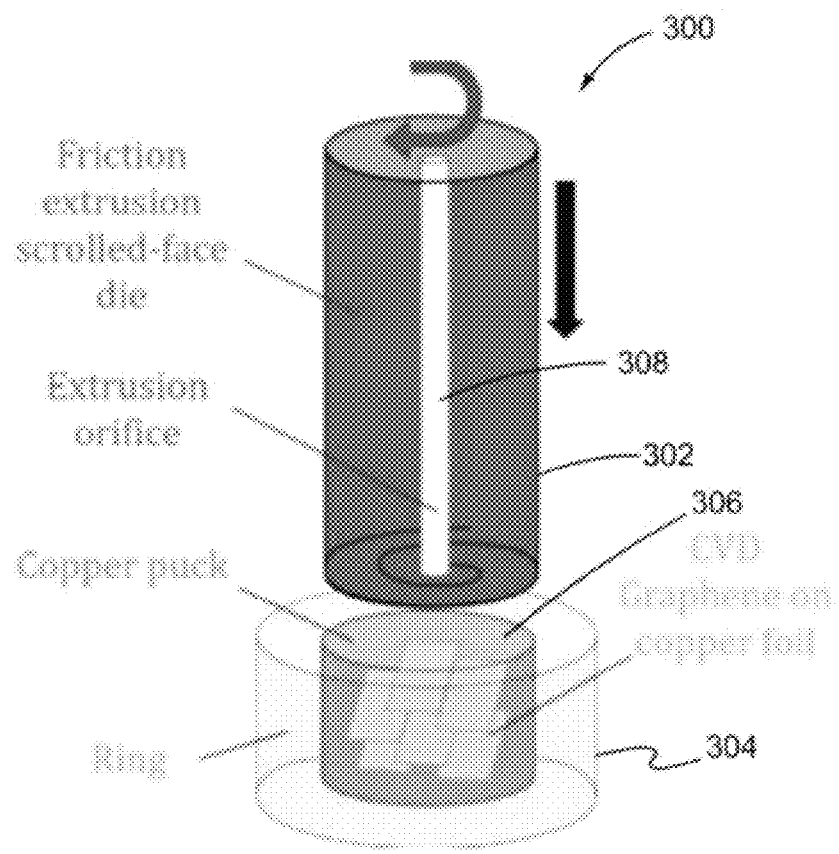

FIG. 20 is an example process and system according to an embodiment of the disclosure.

Figure 21:
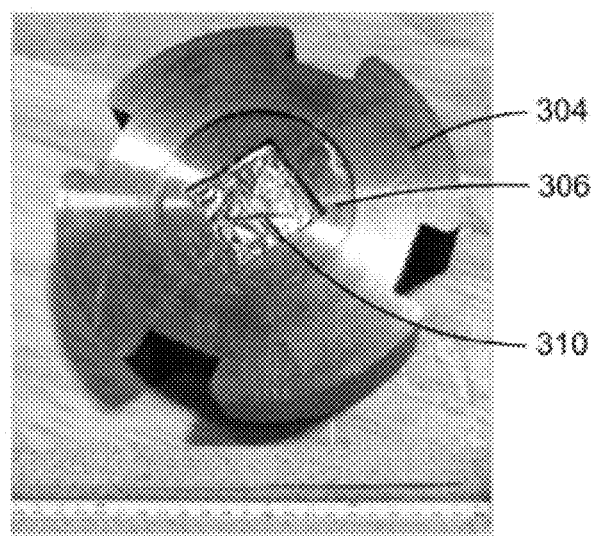

FIG. 21 is example feedstock materials according to an embodiment of the disclosure.

Figure 22:
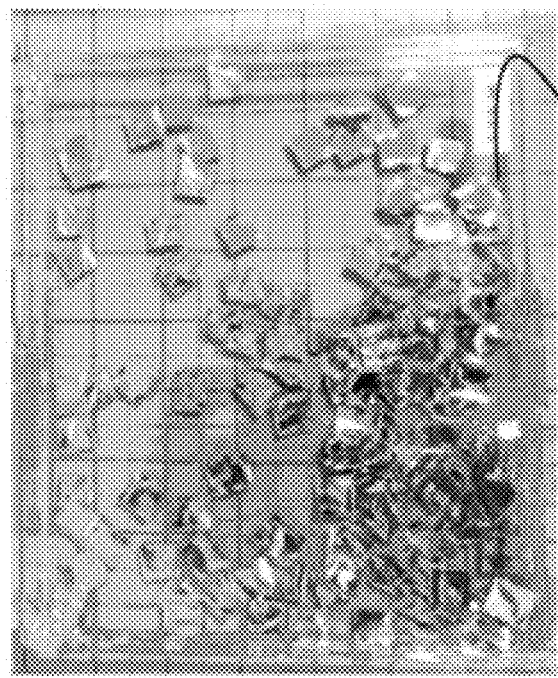

FIG. 22 is example feedstock preparations according to an embodiment of the disclosure.

Figure 23:
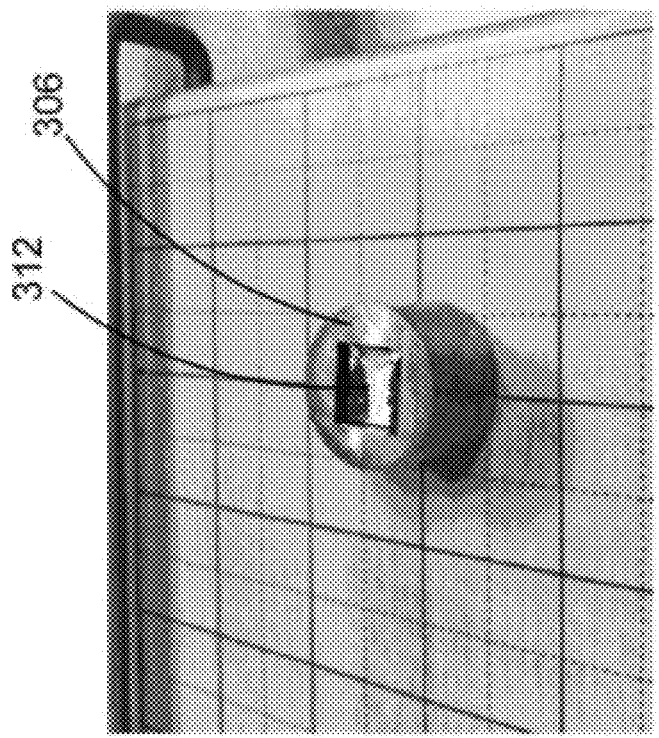

FIG. 23 is an example feedstock material according to an embodiment of the disclosure.

Figure 24:
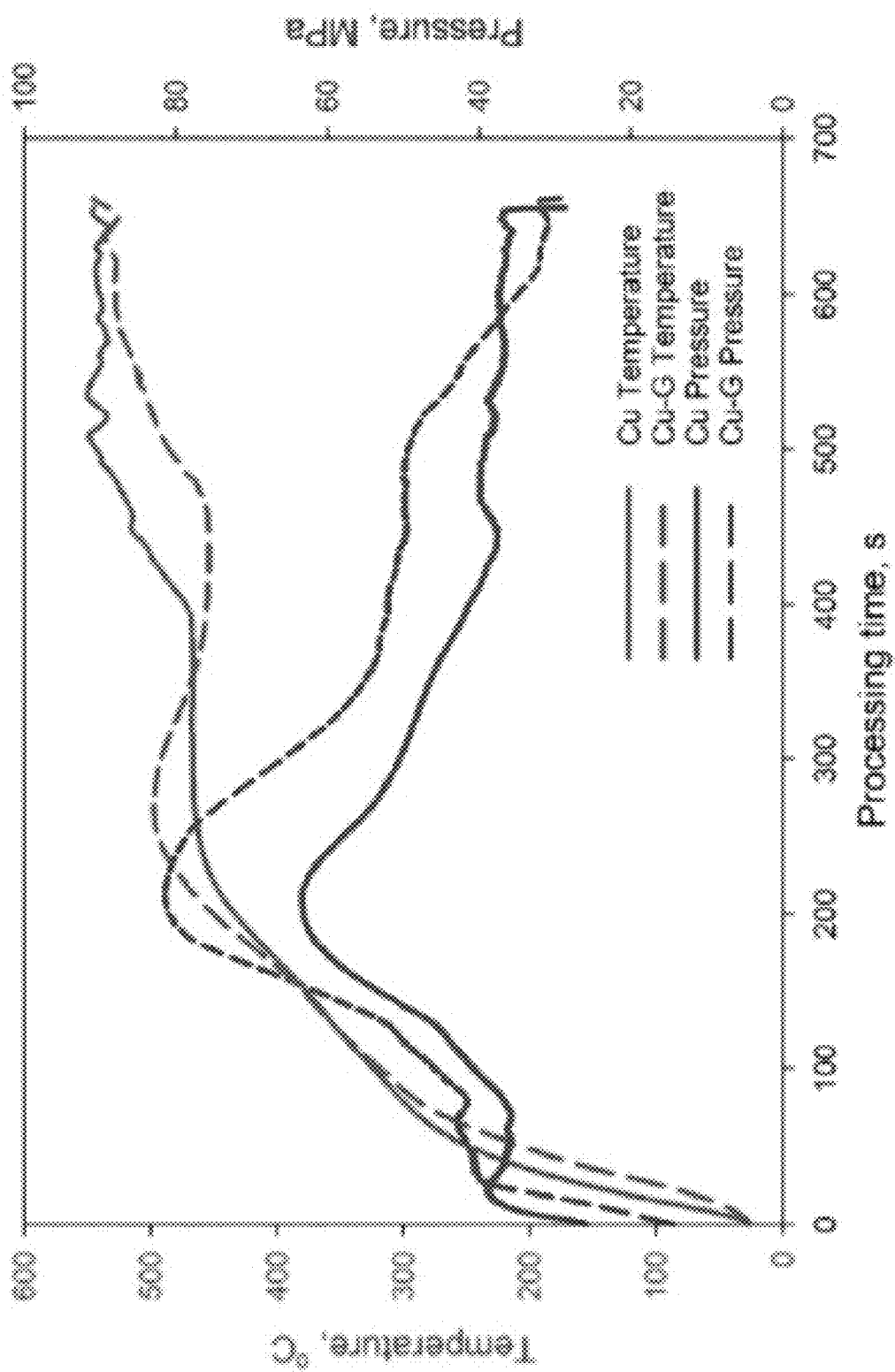

FIG. 24 are process and/or system parameters according to an embodiment of the disclosure.

Figures 25, 26:
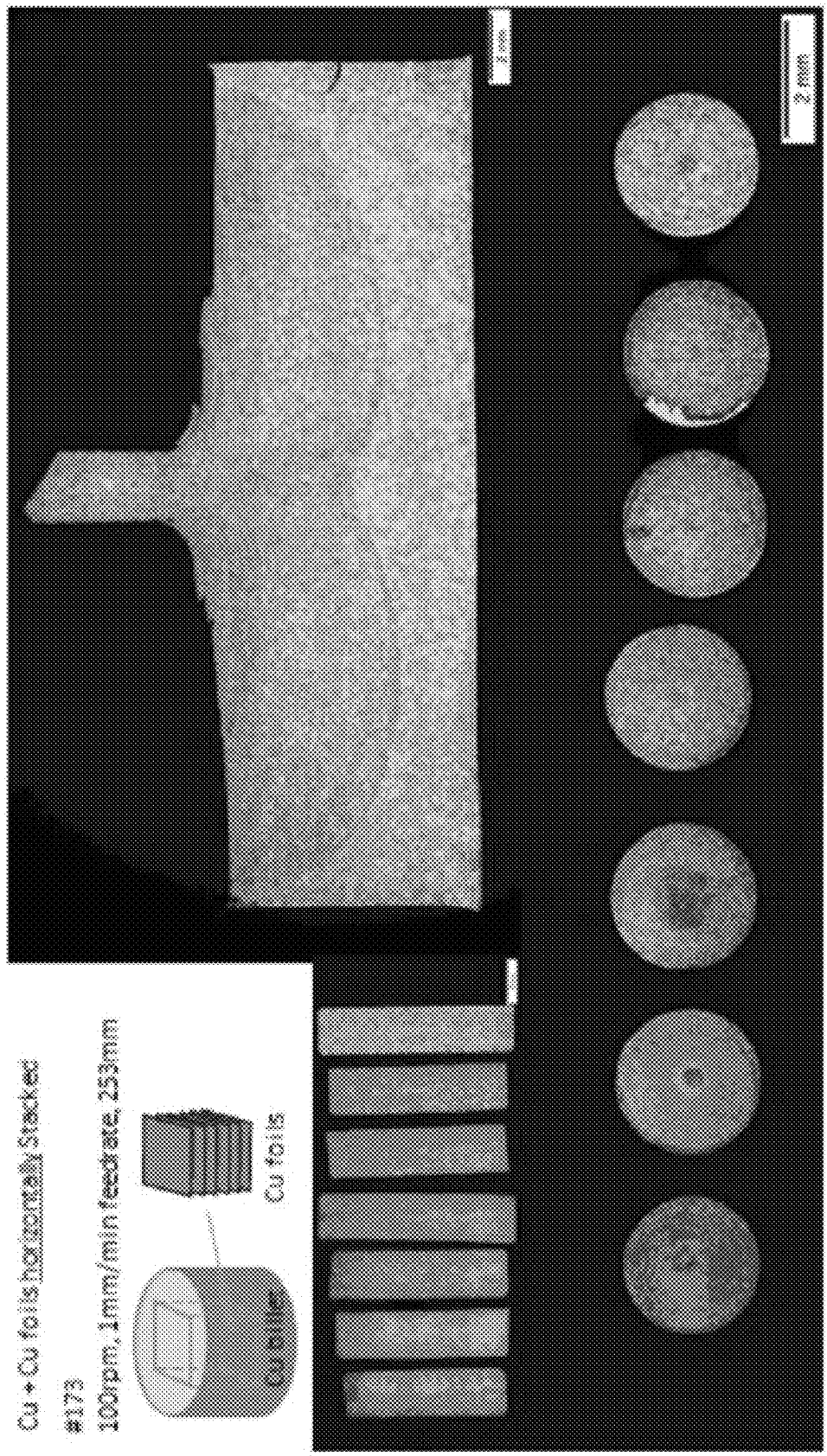

FIG. 25 is a depiction of feedstock materials according to an embodiment of the disclosure.

FIG. 26 is a depiction of processed or remnant feedstock materials in various cross sections showing a consolidated copper-graphene microstructure with minimal porosity according to an embodiment of the disclosure.

Figure 27:
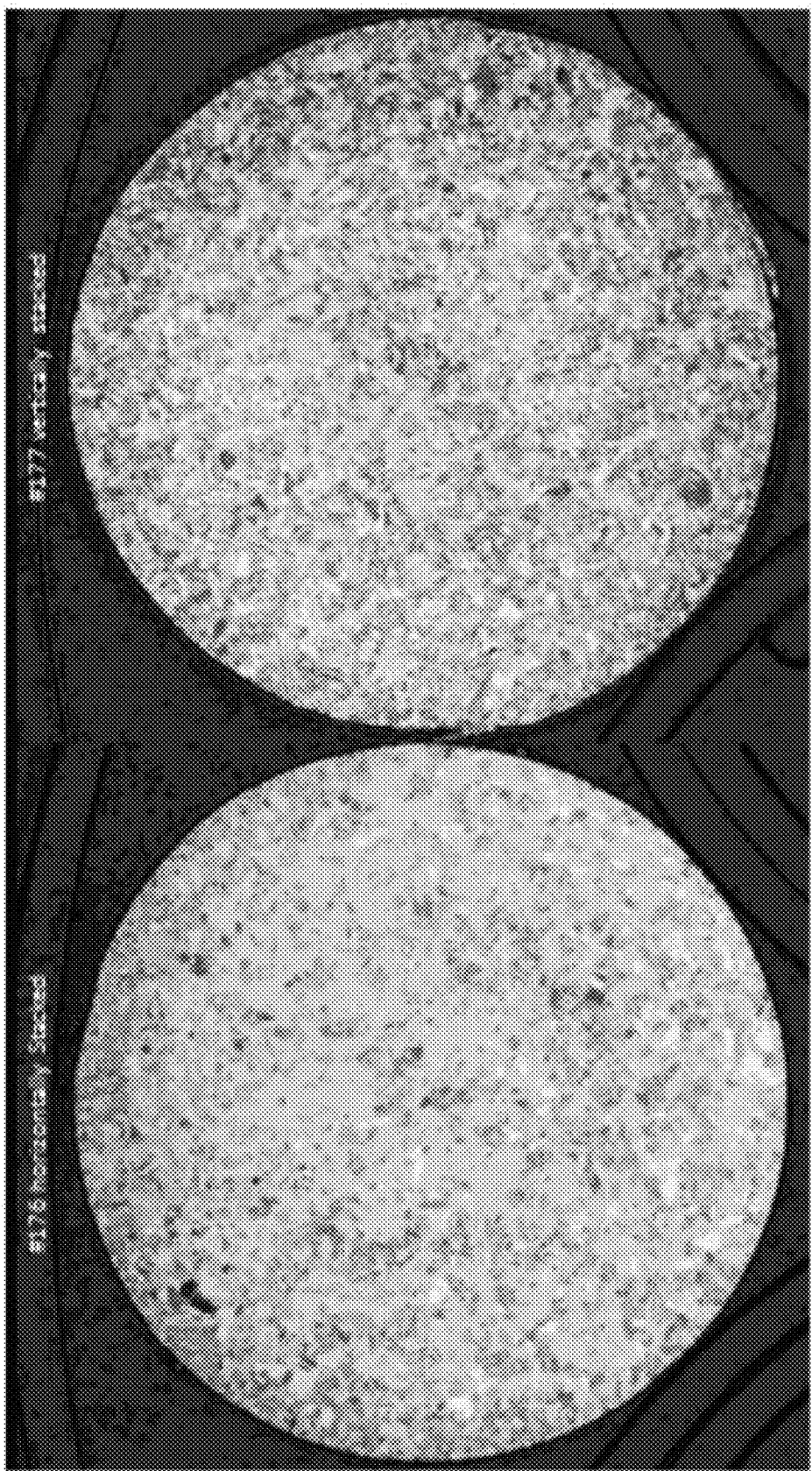

FIG. 27 are cross sections of extrudate materials according to an embodiment of the disclosure.

Figure 28:
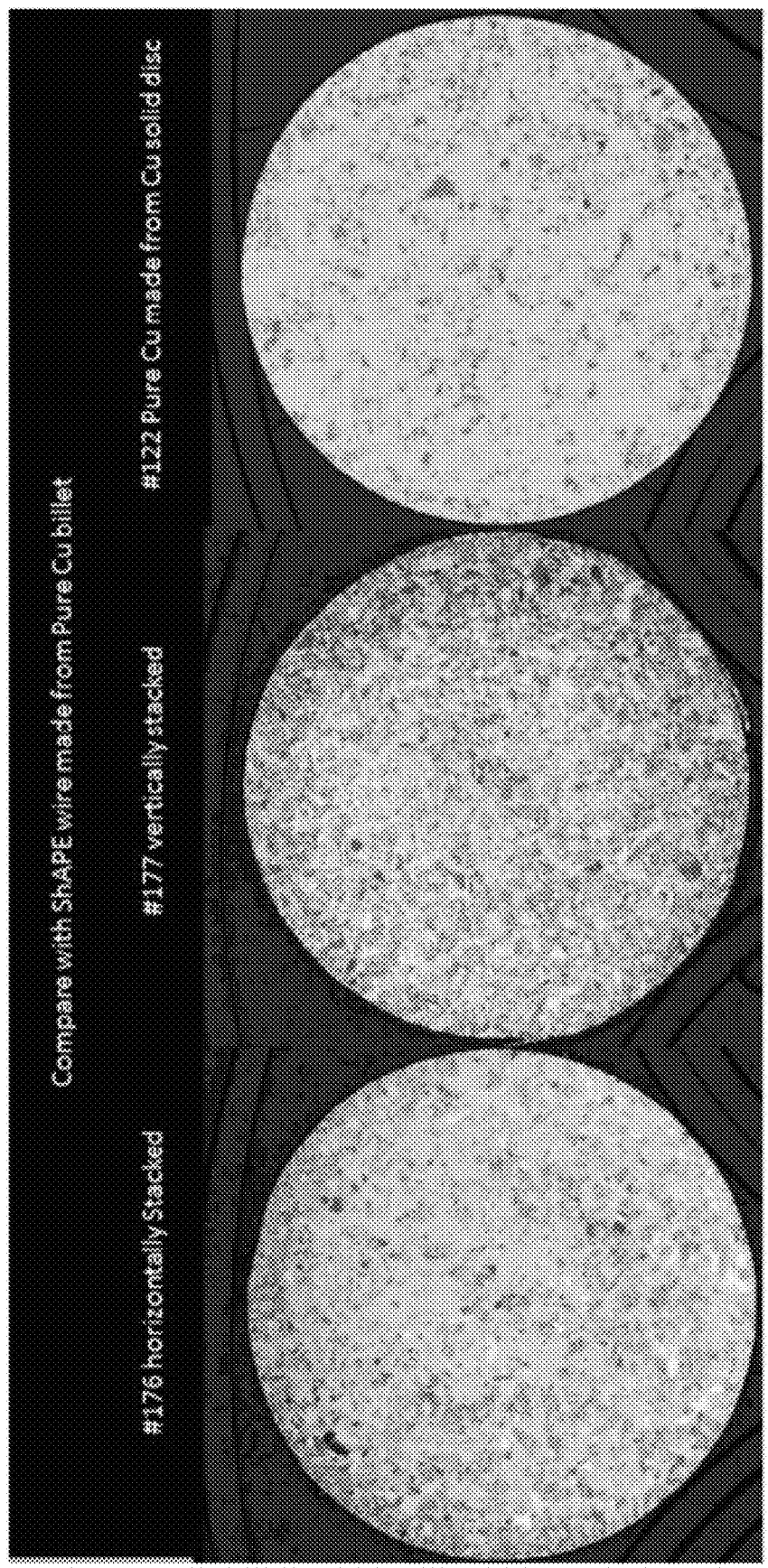

FIG. 28 are cross sections of extrudate materials according to an embodiment of the disclosure.

Figure 29:
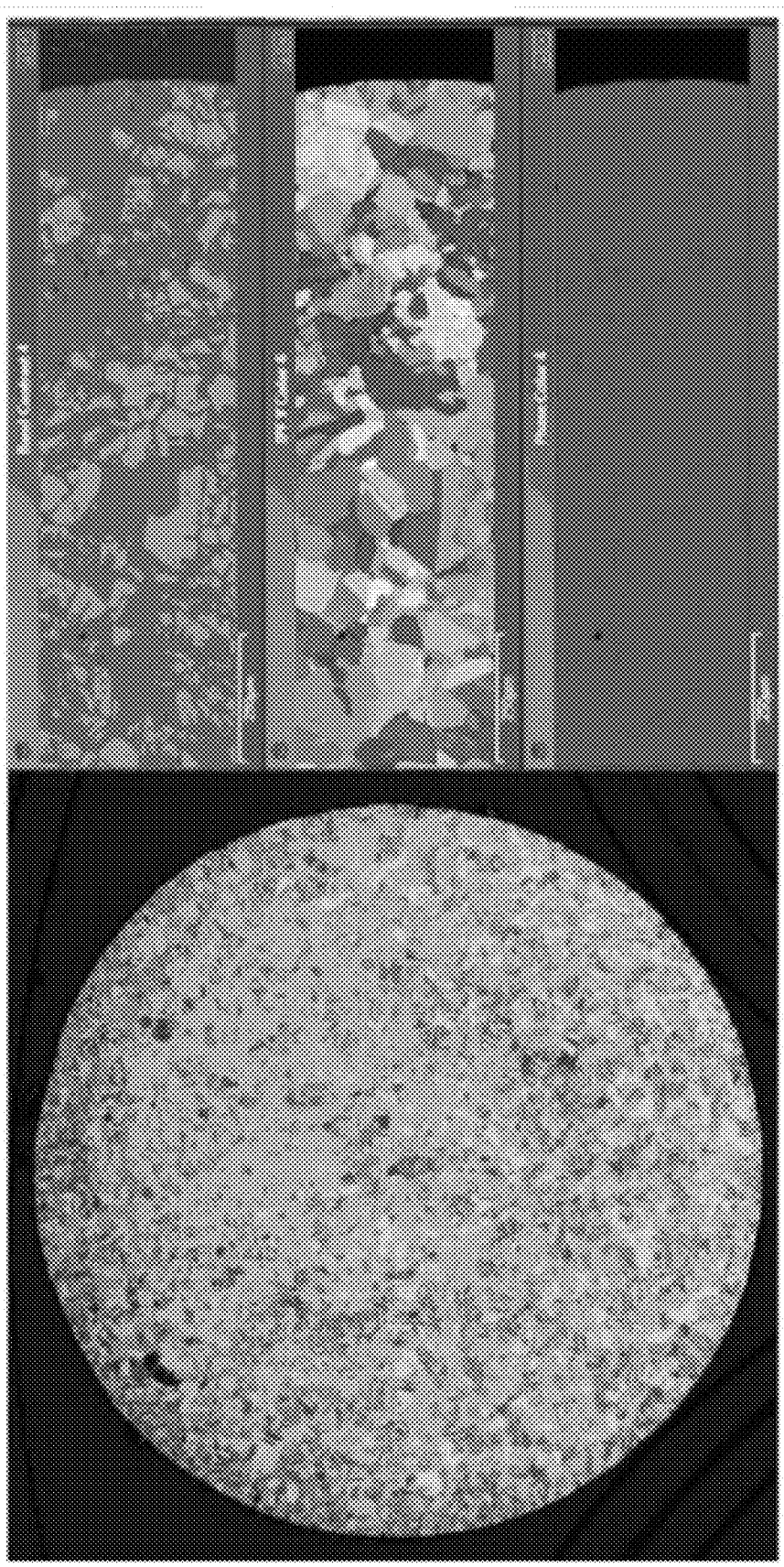

FIG. 29 is a cross section and more detailed cross sectional views of extrudate material according to an embodiment of the disclosure.

Figures 30, 31:
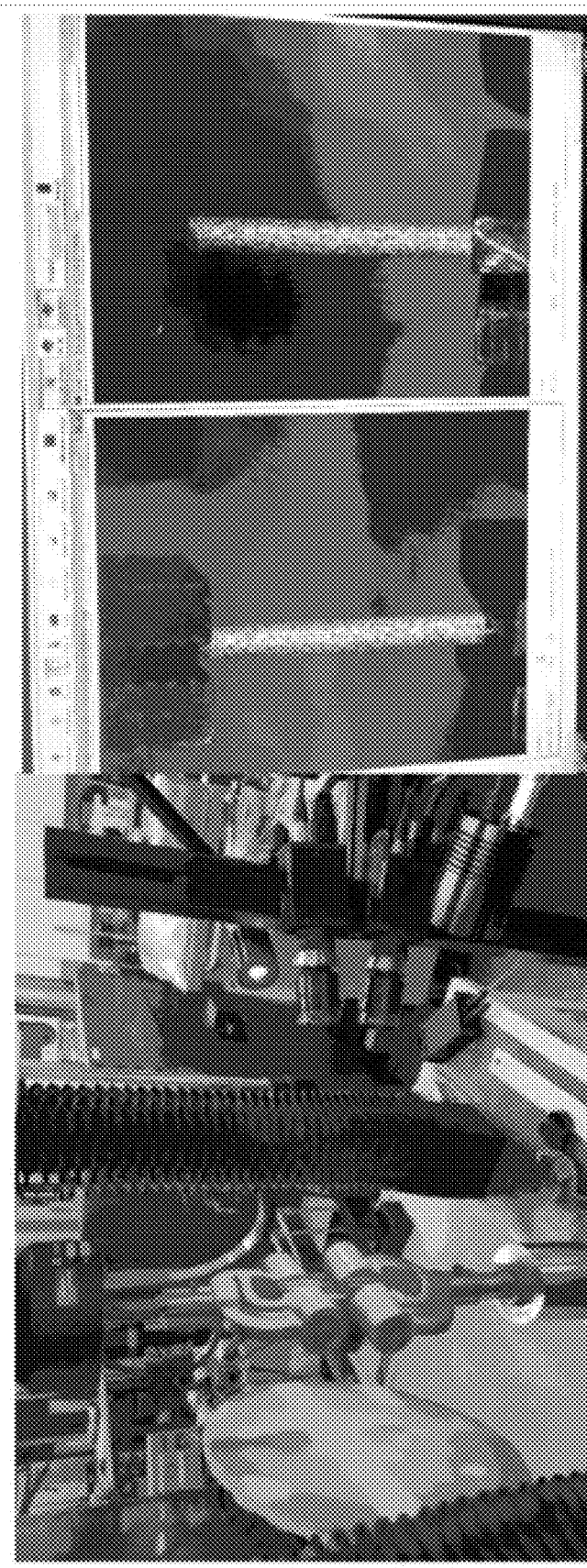

FIG. 30 is a mechanical stress testing apparatus utilized according to an embodiment of the disclosure.

FIG. 31 is extrudate material under mechanical stress testing according to an embodiment of the disclosure.

Figure 32:
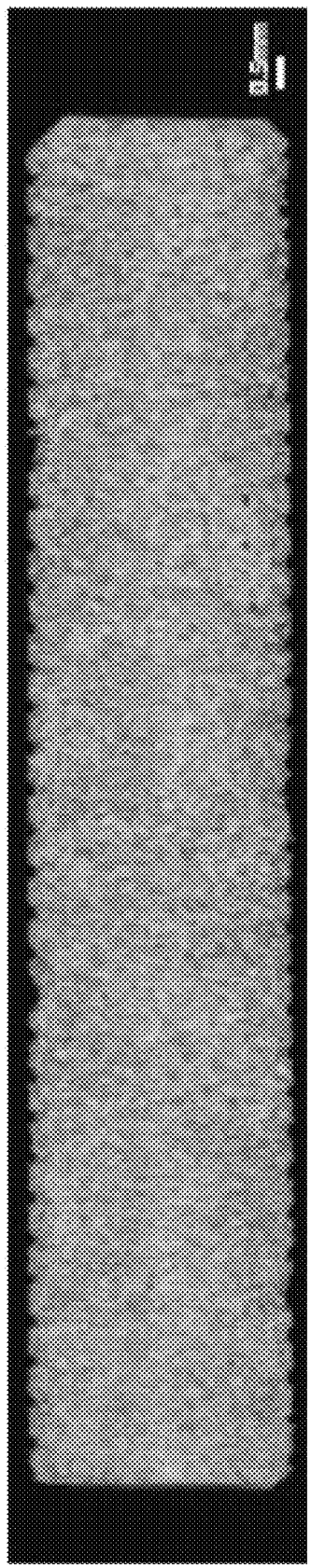

FIG. 32 is extrudate material according to an embodiment of the disclosure.

FIG. 33 is extrudate material undergoing mechanical stress testing according to an embodiment of the disclosure.

Figure 34:
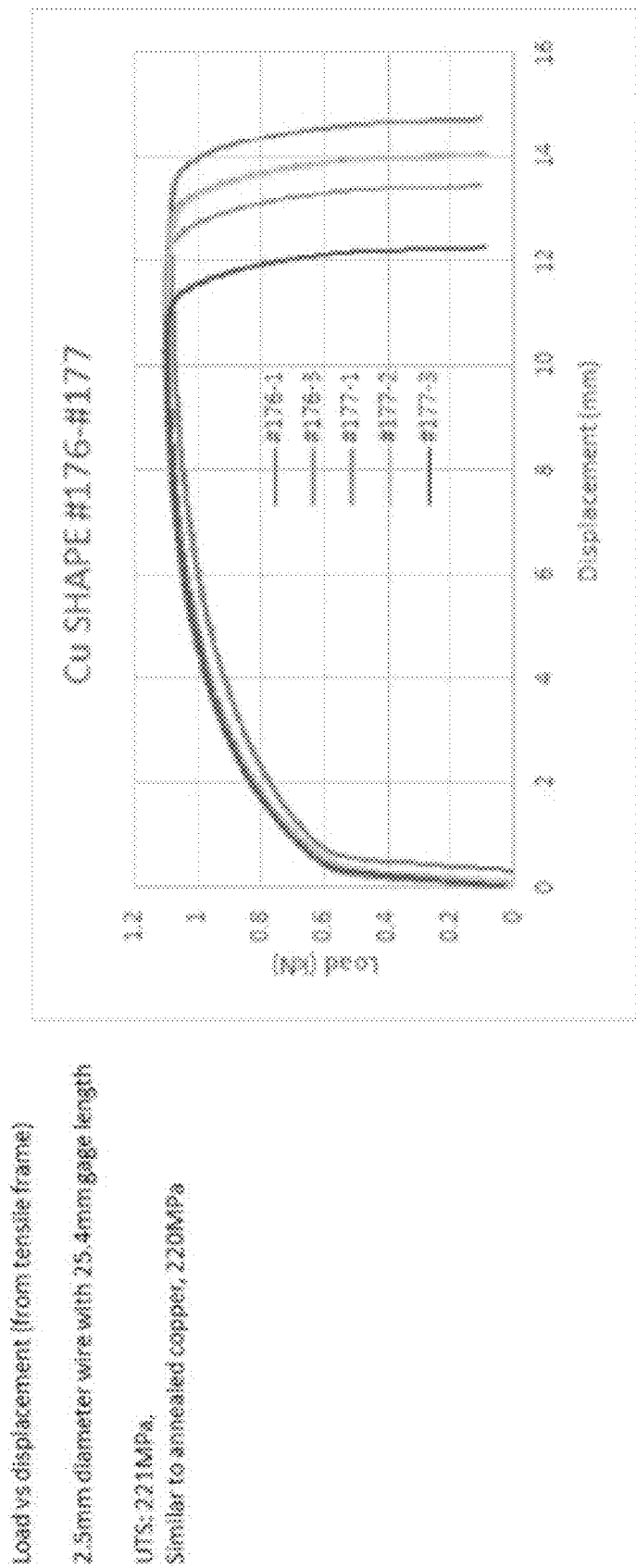

FIG. 34 is a depiction of mechanical property data of extrudate materials according to an embodiment of the disclosure.

Figure 35:
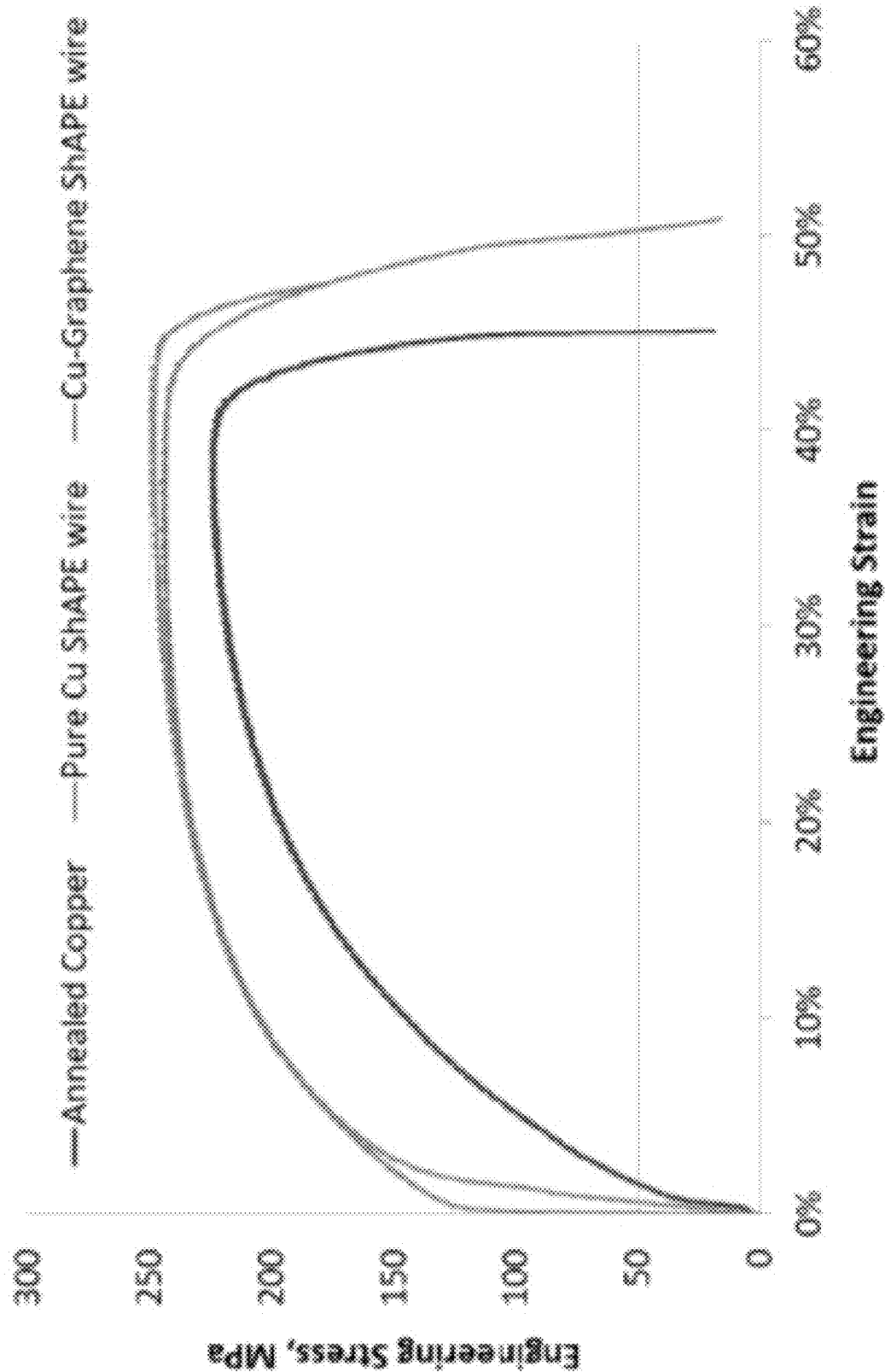

FIG. 35 is a depiction of mechanical property data of extrudate materials according to an embodiment of the disclosure.

Figure 36:
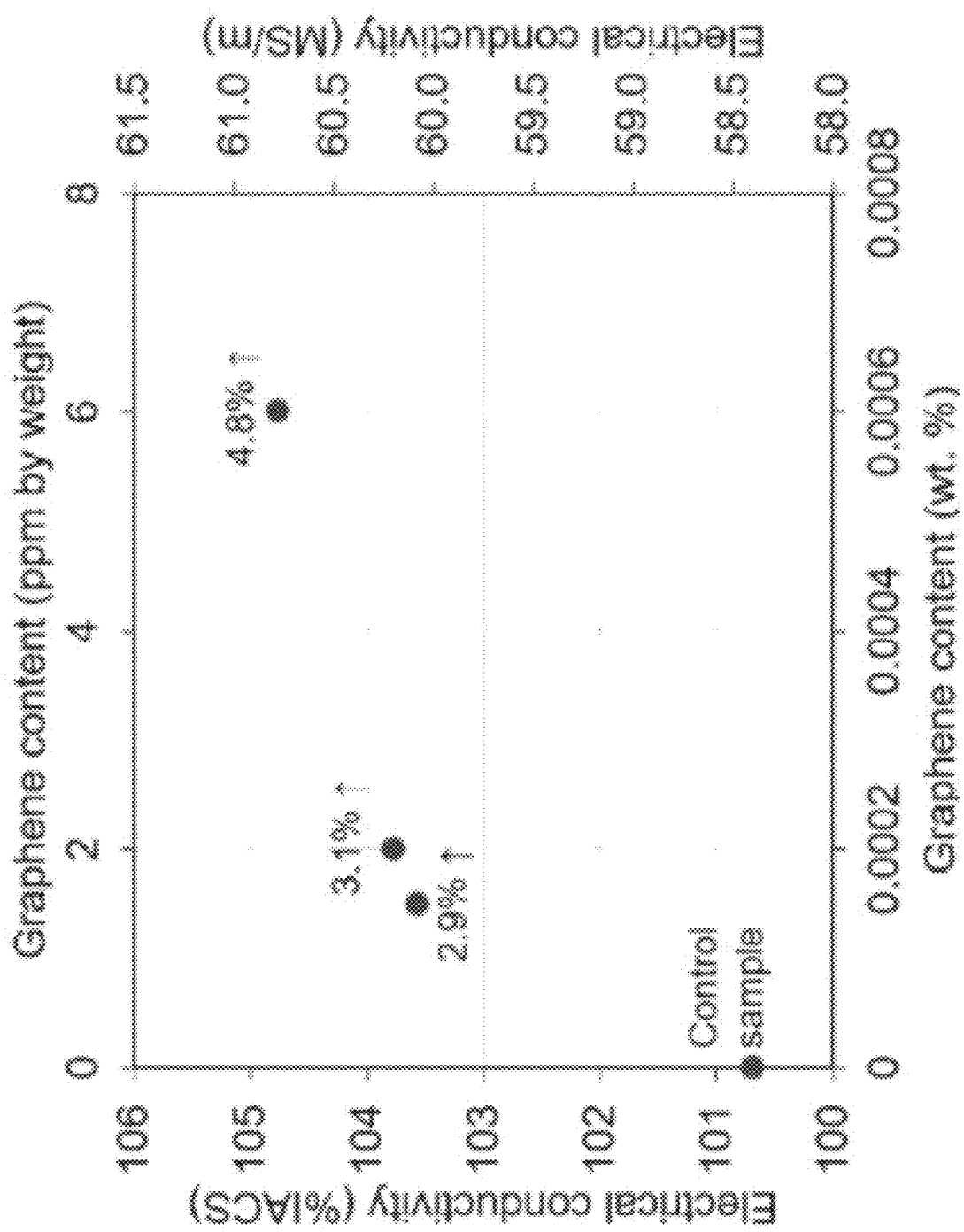

FIG. 36 is a depiction of conductivity data of extrudate materials according to an embodiment of the disclosure.

Figure 37:
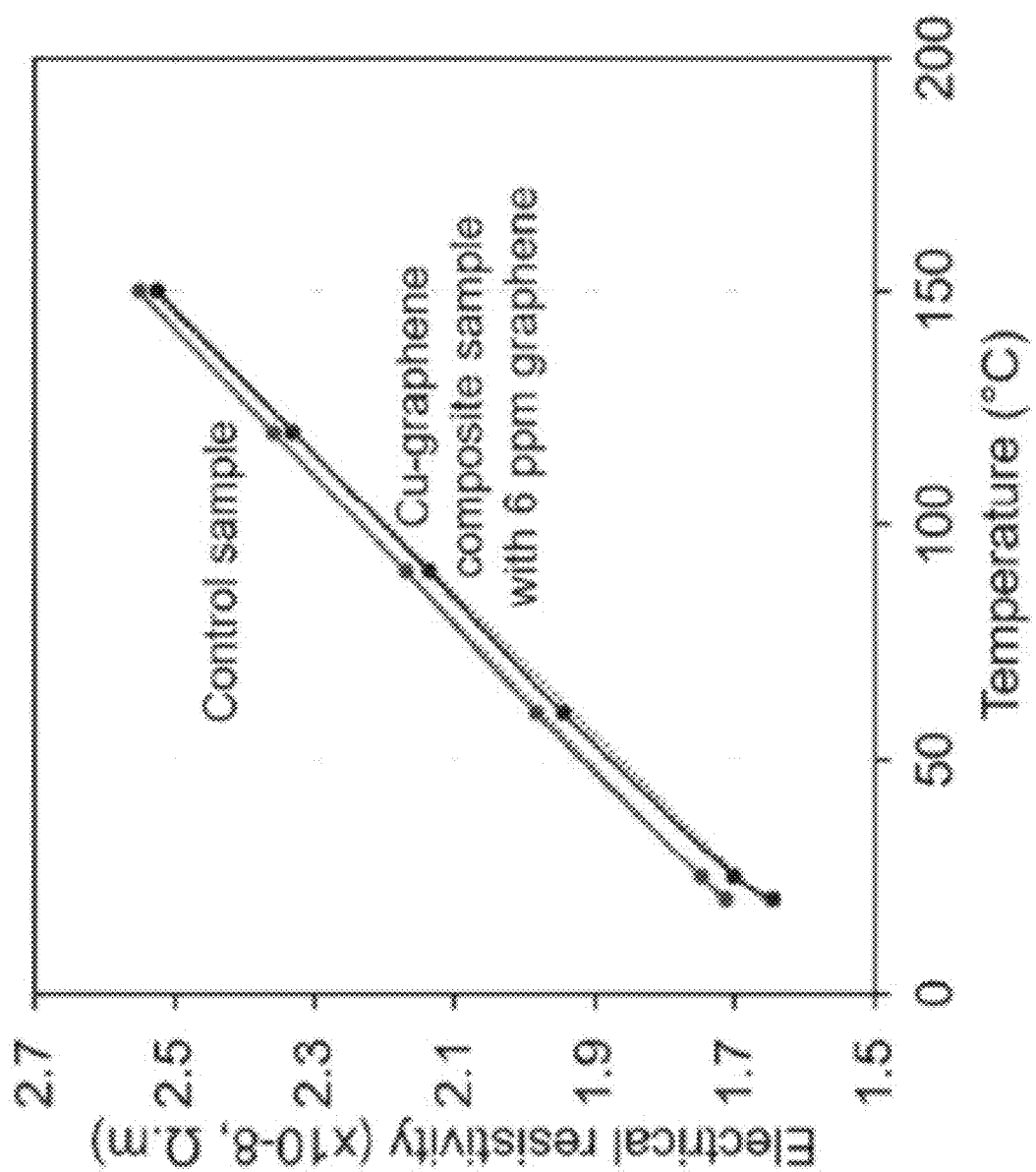

FIG. 37 is a depiction of resistivity data at increased temperature of extrudate materials according to an embodiment of the disclosure.

Figure 38:
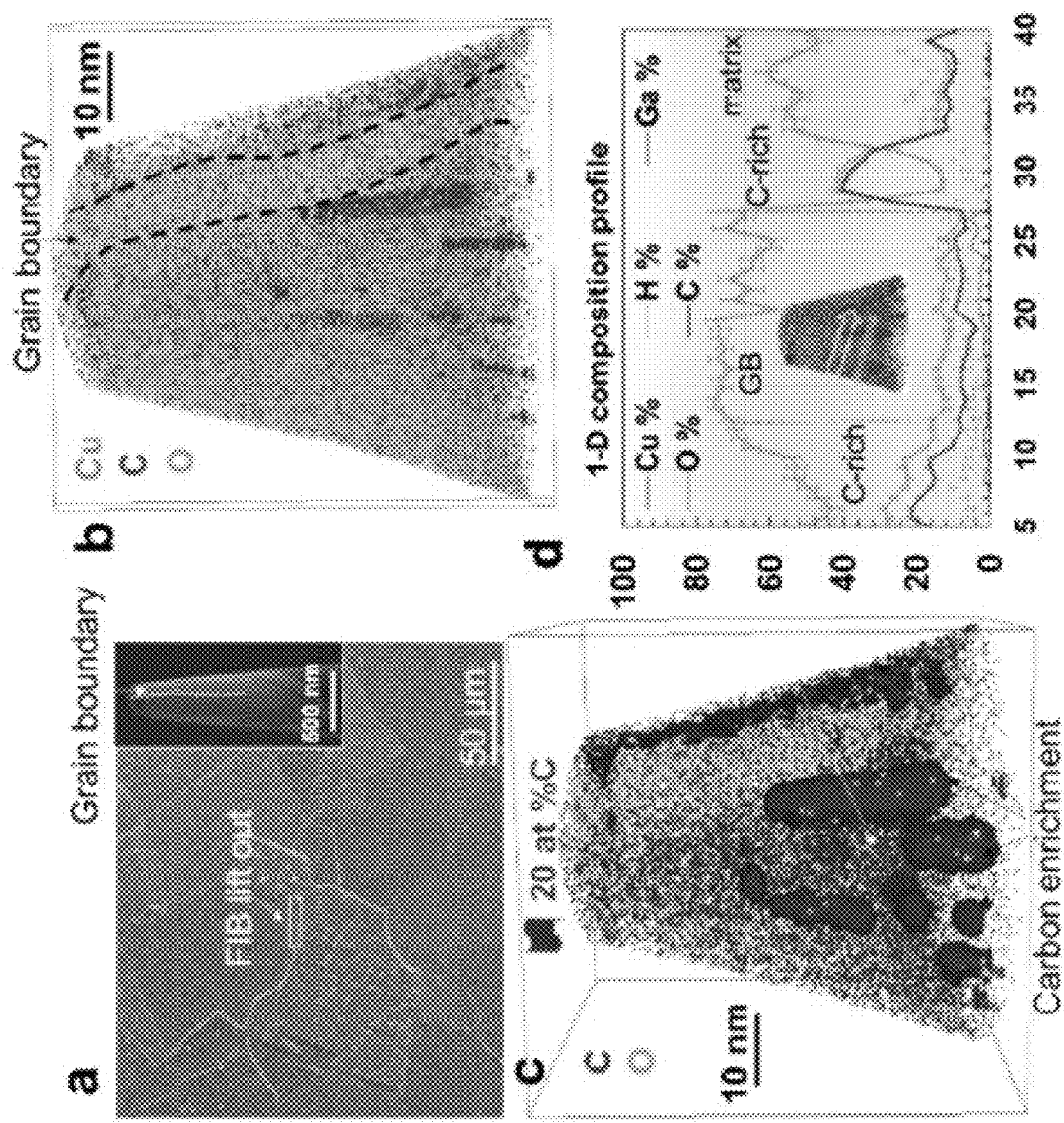

FIG. 38 is a depiction of additional detailed material characteristics data of extrudate materials according to an embodiment of the disclosure.

DESCRIPTION

This disclosure is submitted in furtherance of the constitutional purposes of the U.S. Patent Laws "to promote the progress of science and useful arts" (Article 1, Section 8).

The following description including the attached pages provide various examples of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In the previously described and related applications various methods and techniques are described wherein the described technique and device (referred to as ShAPE) is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications such as projectiles. Exemplary applications will be discussed on more detail in the following.

Figure 1A:
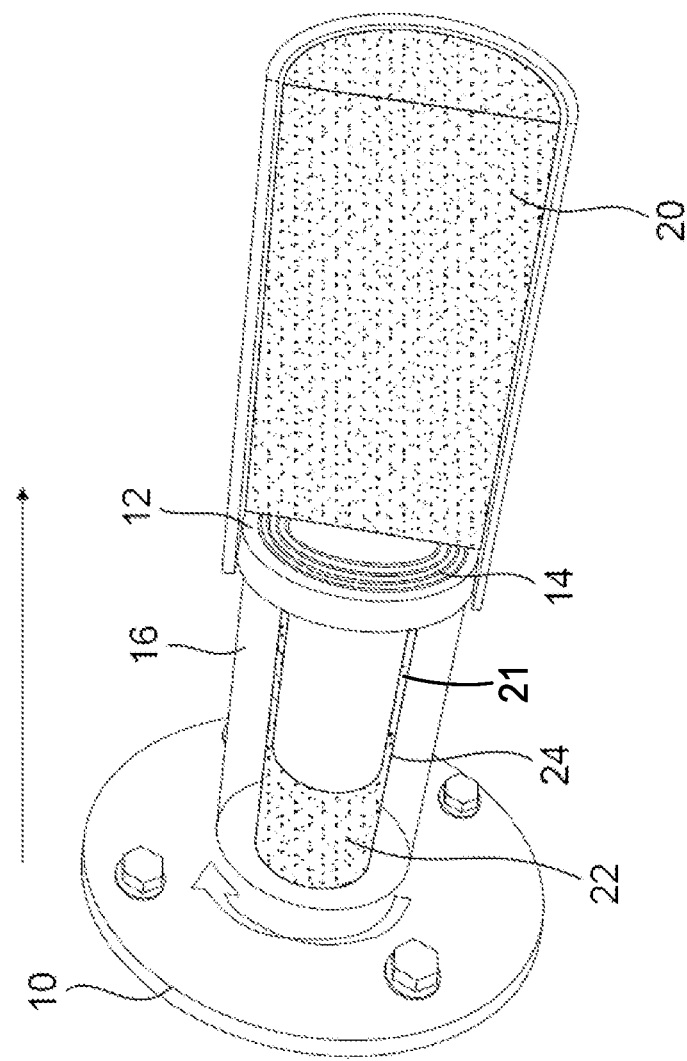
FIG. 1A shows a ShAPE setup for extruding hollow cross section pieces.
Figure 1B:
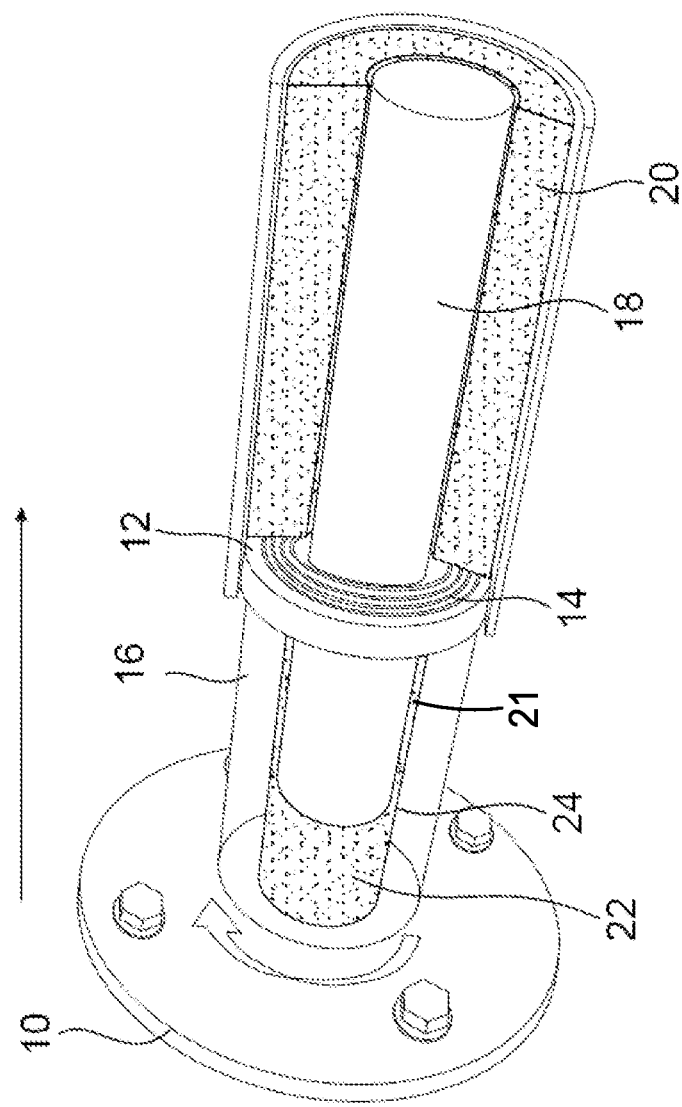
FIG. 1B shows another configuration for extruding hollow cross-sectional pieces.

Referring first now to FIGS. 1A and 1B, examples of the ShAPE device and arrangement are provided. In an arrangement such as the one shown in FIG. 1A, rotating die 10 is thrust into a material 20 under specific conditions whereby the rotating and shear forces of the die face 12 and the die plunge 16 combine to heat and/or plasticize the material 20 at the interface of the die face 12 and the material 20 and cause the plasticized material to flow in desired direction in either a direct or indirect manner. (In other embodiments the material 20 may spin and the die 10 pushed axially into the material 20 so as to provide this combination of forces at the material face.) In either instance, the combination of the axial and the rotating forces plasticize the material 20 at the interface with the die face 12. Flow of the plasticized material can then be directed to another location wherein a die bearing surface 24 of a preselected length facilitates the recombination of the plasticized material into an arrangement wherein a new and more refined grain size and texture control at the micro level can take place. This then translates to an extruded product 22 with desired characteristics. This process enables better strength, ductility, and corrosion resistance at the macro level together with increased and better performance. This process can eliminate the need for additional heating, and the process can utilize a variety of forms of material including billet, powder or flake without the need for extensive preparatory processes such as "steel canning", billet pre-heating, de-gassing, de-canning and other process steps can be utilized as well. This arrangement also provides for a methodology for performing other steps such as cladding, enhanced control for through wall thickness and other characteristics, joining of dissimilar materials and alloys, and beneficial feedstock materials for subsequent rolling operations.

This arrangement is distinct from and provides a variety of advantages over the prior art methods for extrusion. First, during the extrusion process the force rises to a peak in the beginning and then falls off once the extrusion starts. This is called breakthrough. In this ShAPE process the temperature at the point of breakthrough is very low. For example for Mg tubing, the temperature at breakthrough for the 2" OD, 75 mil wall thickness ZK60 tubes is <150C. This lower temperature breakthrough is believed in part to account for the superior configuration and performance of the resulting extrusion products.

Another feature is the low extrusion coefficient kf which describes the resistance to extrusion (i.e. lower kf means lower extrusion force/pressure). Kf is calculated to be 2.55 MPa and 2.43 MPa for the extrusions made from ZK60-T5 bar and ZK60 cast respectively (2" OD, 75 mil wall thickness). The ram force and kf are remarkably low compared to conventionally extruded magnesium where kf ranges from 68.9-137.9 MPa. As such, the ShAPE process achieved a 20-50 times reduction in kf (as thus ram force) compared to conventional extrusion. This assists not only with regard to the performance of the resulting materials but also reduced energy consumption required for fabrication. For example, the electrical power required to extrude the ZK60-T5 bar and ZK60 cast (2" OD, 750 mil wall thickness) tubes is 11.5 kW during the process. This is much lower than a conventional approach that uses heated containers/billets. Similar reductions in kf have also been observed when extruding high performance aluminum powder directing into wire, rod, and tubing.

The ShAPE process is significantly different than Friction Stir Back Extrusion (FSBE). In FSBE, a spinning mandrel is rammed into a contained billet, much like a drilling operation. Scrolled grooves force material outward and material back extrudes around and onto the mandrel to form a tube, not having been forced through a die. As a result, only very small extrusion ratios are possible, the tube is not fully processed through the wall thickness, the extrudate is not able to push off of the mandrel, and the tube length is limited to the length of the mandrel. In contrast, ShAPE utilizes spiral grooves on a die face to feed material inward through a die and around a mandrel that is traveling in the same direction as the extrudate. As such, a much larger outer diameter and extrusion ratio are possible, the material is uniformly processed through the wall thickness, the extrudate is free to push off the mandrel as in conventional extrusion, and the extrudate length is only limited only by the starting volume of the billet. ShAPE can be scalable to the manufacturing level, while the limitations of FSBE have kept the technology as a non-scalable academic interest since FBSE was first reported.

An example of an arrangement using a ShAPE device and a mandrel 18 is shown in FIG. 1B. This device and associated processes have the potential to be a low-cost, manufacturing technique to fabricate variety of materials. As will be described below in more detail, in addition to modifying various parameters such as feed rate, heat, pressure and spin rates of the process, various mechanical elements of the tool assist to achieve various desired results. For example, varying scroll patterns 14 on the face of extrusion dies 12 can be used to affect/control a variety of features of the resulting materials. This can include control of grain size and crystallographic texture along the length of the extrusion and through-wall thickness of extruded tubing and other features. Alteration of parameters can be used to advantageously alter bulk material properties such as ductility and strength and allow tailoring for specific engineering applications including altering the resistance to crush, pressure or bending. Scrolls patterns have also been found to affect grain size and texture through the thickness of the extrusion.

The ShAPE process has been utilized to form various structures from a variety of materials including the arrangement as described in the following table.

TABLE 1

| Alloy | Material Class | Precursor Form |
|---|---|---|
| PUCKS | | |
| $Bi_2Te_3$ | Thermoelectric | Powder |
| Fe—Si | Magnet | Powder |
| $Nd_2Fe_{11}B$/Fe | Magnet | Powder |
| MA956 | ODS Steel | Powder |
| Nb 0.95 Ti 0.05 Fe 1 Sb 1 | Thermoelectric | Powder |
| Mn—Bi | Magnet | Powder |
| Cu—Nb | Immiscible alloy | Powder |
| Al—Si | Aluminum MMC | Powder |
| AlCuFe(Mg)Ti | High Entropy Alloy | Chunks |
| TUBES | | |
| ZK60 | Magnesium Alloy | Barstock, As-Cast Ingot |
| AZ31 | Magnesium Alloy | Barstock |
| AZ91 | Magnesium Alloy | Flake, Barstock, As-Cast Ingot |
| $Mg_2Si$ | Magnesium Alloy | As-Cast Ingot |
| $Mg_2Si$ | Magnesium Alloy | As-Cast Ingot |
| AZ91- 1, 5 and 10 wt. % $Al_2O_3$ | Magnesium MMC | Mechanically Alloyed Flake |
| AZ91- 1, 5 and 10 wt. % $Y_2O_3$ | Magnesium MMC | Mechanically Alloyed Flake |
| AZ91- 1, 5 and 10 and 5 wt. % SiC | Magnesium MMC | Mechanically Alloyed Flake |
| Al-12.4TM | High Strength Aluminum | Powder |
| AA6063 | Aluminum Alloy | As-Cast, Barstock, Chip |
| AA6061 | Aluminum Alloy | Barstock |
| AA7075 | Aluminum Alloy | As-Cast, Barstock, |
| RODS | | |
| Al—Mn wt. 15% | Aluminum Manganese Alloy | As-Cast |
| Al—Mg | Mg Al Co-extrusion | Barstock |
| Mg—Dy—Nd—Zn—Zr | Magnesium Rare Earth | Barstock |
| Cu | Pure Copper | Barstock |
| Cu-Graphene/Graphite | Copper Composite | Powder |
| Mg | Pure Magnesium | Barstock |
| AA6061 | Aluminum | Barstock and As-Cast |
| AA7075 | High Strength Aluminum | Barstock and As-Cast |
| Al—Ti—Mg—Cu—Fe | High Entropy Alloy | As-Cast |
| Al- 1, 5, 10 at. % Mg | Magnesium Alloy | As-Cast |
| AZS312 | Magnesium Alloy | As-Cast |
| A-12.4TM | High Strength Aluminum | Powder |

TABLE 1-continued

| Alloy | Material Class | Precursor Form |
|---|---|---|
| Rhodium | Pure Rhodium | Barstock |
| Cu—Nb | Immiscible alloy | Powder |
| Al—Si | Aluminum M | |

In addition, to the pucks, rods and tubes described above, the present disclosure also provides a description of the use of a specially configured scroll component referred by the inventors as a portal bridge die head which allows for the fabrication of ShAPE extrusions with non-circular hollow profiles. This configuration allows for making extrusion with non-circular, and multi-zoned, hollow profiles using a specially formed portal bridge die and related tooling.

Figure 2A:
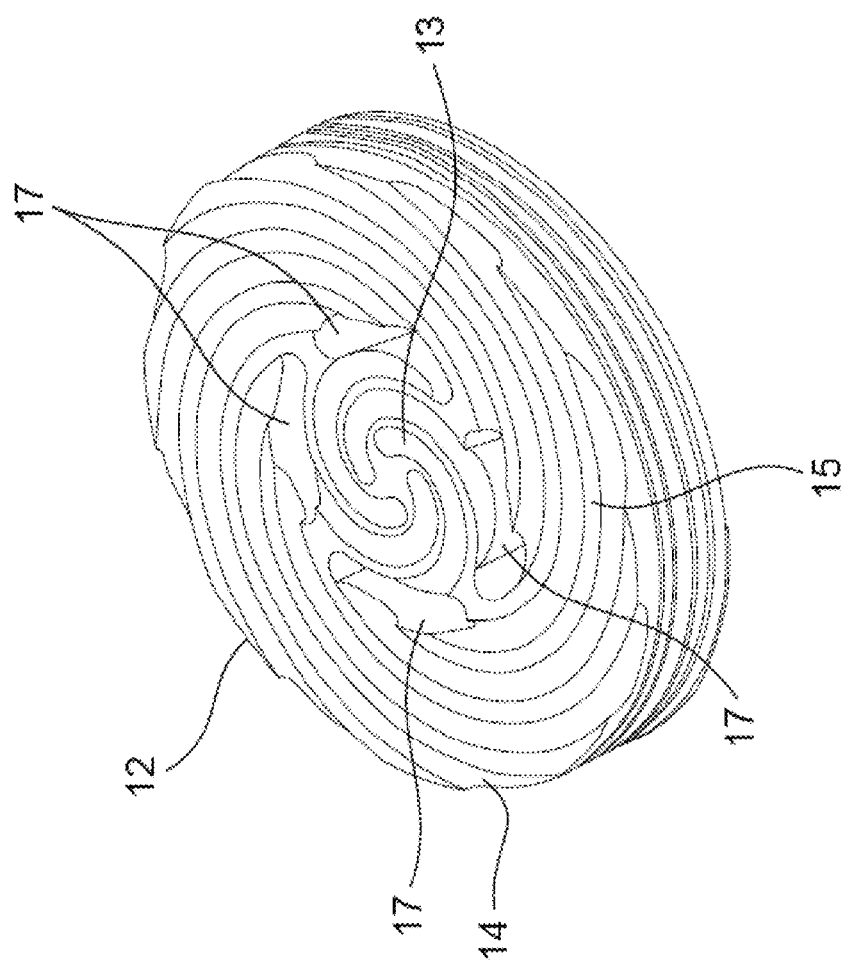
FIG. 2A shows a top perspective view of a modified scroll face tool for a portal bridge die.
Figure 2B:
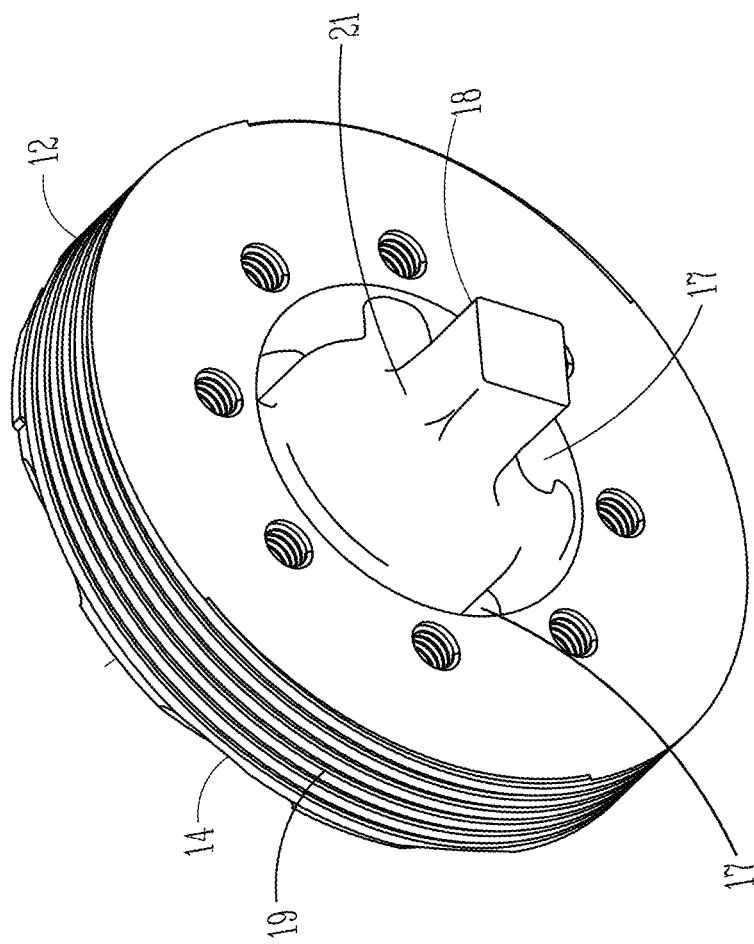
FIG. 2B shows a bottom perspective view of a modified scroll face that operates like a portal bridge die.
Figure 2C:
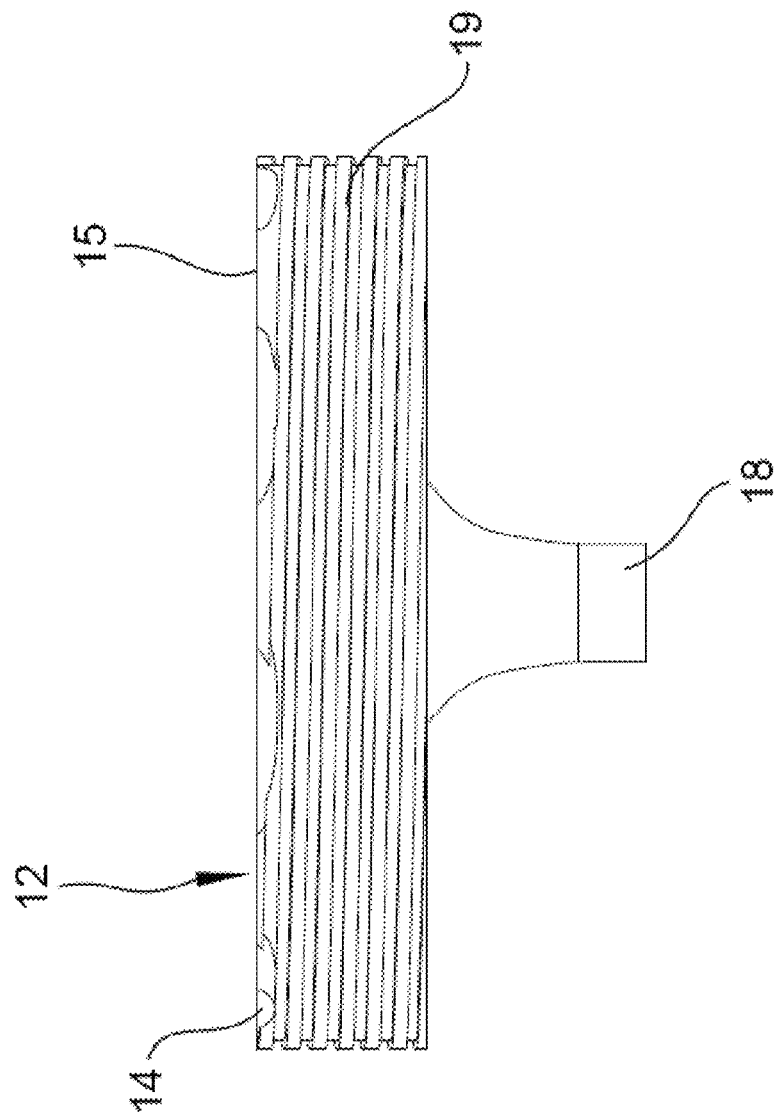
FIG. 2C shows a side view of the modified portal bridge die.

FIGS. 2A-2C show various views of a portal bridge die design with a modified scroll face that unique to operation in the ShAPE process. FIG. 2A shows an isometric view of the scroll face on top of the portal bridge die and FIG. 2B shows an isometric view of the bottom of the portal bridge die with the mandrel visible.

In the present embodiment grooves 13, 15 on the face 12 of the die 10 direct plasticized material toward the aperture ports 17. Plasticized material then passes through the aperture ports 17 wherein it is directed to a die bearing surface 24 within a weld chamber similar to conventional portal bridge die extrusion. In this illustrative example, material flow is separated into four distinct streams using four ports 17 as the billet and the die are forced against one another while rotating.

While the outer grooves 15 on the die face feed material inward toward the ports 17, inner grooves 13 on the die face feed material radially outward toward the ports 17. In this illustrative example, one groove 13 is feeding material radially outward toward each port 17 for a total of four outward flowing grooves. The outer grooves 15 on the die surface 12 feed material radially inward toward the port 17. In this illustrative example, two sets of grooves are feeding material radially inward toward each port 17 for a total of eight inward feeding grooves 15. In addition to these two sets of grooves, a perimeter groove 19 on the outer perimeter of the die, shown in FIG. 2C, is oriented counter to the die rotation so as to provide back pressure thereby minimizing material flash between the container and die during extrusion.

FIG. 2B shows a bottom perspective view of the portal bridge die 12. In this view, the die shows a series of full penetration of ports 17. In use, streams of plasticized material tunneled by the inward 15 and outward 13 directed grooves described above pass through these ports 17 and then are recombined in a weld chamber 21 and then flow around a mandrel 18 to create a desired cross section. The use of scrolled grooves 13, 15, 19 to feed the ports 17 during rotation—as a means to separate material flow of the feedstock (e.g. powder, flake, billet, etc.) into distinct flow streams has never been done to our knowledge. This arrangement enables the formation of items with noncircular hollow cross sections.

Figure 3:
FIG. 3 shows an illustrative view of material separated using at least some of the devices shown in FIGS. 1A-2C.

FIG. 3 shows a separation of magnesium alloy ZK60 into multiple streams using the portal bridge die approach during ShAPE processing. (In this case the material was allowed to separate for effect and illustration of the separation features and not passed over a die bearing surface for combination). Conventional extrusion does not rotate and the addition of grooves would greatly impede material flow. But when rotation is present, such as in ShAPE or friction extrusion, the scrolls not only assist flow, but significantly assist the functioning of a portal bridge die extrusion and the subsequent formation of non-circular hollow profile extrusions. Without scrolled grooves feeding the portals, extrusion via the portal bridge die approach using a process where rotation is involved, such as ShAPE, would be ineffective for making items with such a configuration. The prior art conventional linear extrusion process teach away from the use of surface features to guide material into the portals 17 during extrusion.

In the previously described and related applications various methods and techniques are described wherein the ShAPE technique and device is shown to provide a number of significant advantages including the ability to control microstructure such as crystallographic texture through the cross sectional thickness, while also providing the ability to perform various other tasks. In this description we provide information regarding the use of the ShAPE technique to form materials with non-circular hollow profiles as well as methods for creating high entropy alloys that are useful in a variety of applications. These two exemplary applications will be discussed on more detail in the following.

Figure 4A:
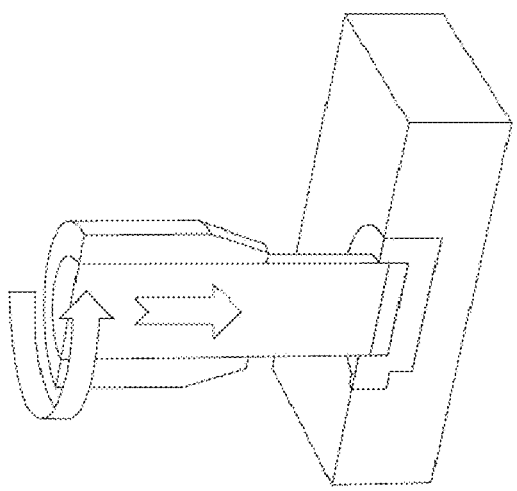
FIG. 4A shows a ShAPE set up for consolidating high entropy alloys (HEAs) from arc melted pucks into densified pucks.
Figure 4C:
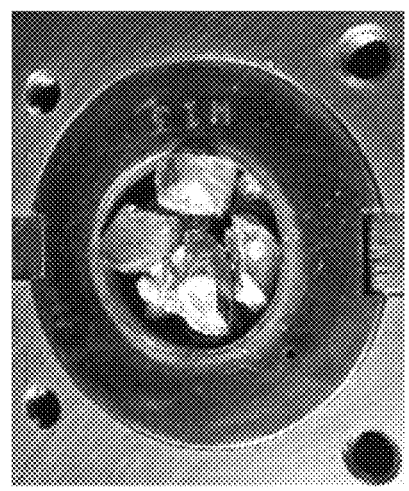
FIG. 4C shows an example of HEA arc melted samples crushed and placed inside the chamber of the ShAPE device prior to processing.
Figure 4B:
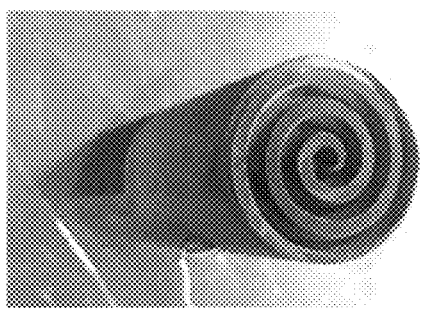
FIG. 4B shows an example of the scrolled face of the rotating tool in FIG. 4A.

FIG. 4A shows a schematic of the ShAPE process which utilizes a rotating tool to apply load/pressure and at the same time the rotation helps in applying torsional/shear forces, to generate heat at the interface between the tool and the feedstock, thus helping to consolidate the material. In this particular embodiment the arrangement of the ShAPE setup is configured so as to consolidate high entropy alloy (HEA) arc-melted pucks into densified pucks. In this arrangement the rotating ram tool is made from an Inconel alloy and has an outer diameter (OD) of 25.4 mm, and the scrolls on the ram face were 0.5 mm in depth and had a pitch of 4 mm with a total of 2.25 turns. In this instance the ram surface incorporated a thermocouple to record the temperature at the interface during processing. (see FIG. 4B) The setup enables the ram to spin at speeds from 25 to 1500 RPM.

In use, both an axial force and a rotational force are applied to a material of interest causing the material to plasticize. In extrusion applications, the plasticized material then flows over a die bearing surface dimensioned so as to allow recombination of the plasticized materials in an arrangement with superior grain size distribution and alignment than what is possible in traditional extrusion processing. As described in the prior related applications this process provides a number of advantages and features that conventional prior art extrusion processing is simply unable to achieve.

High entropy alloys are generally solid-solution alloys made of five or more principal elements in equal or near equal molar (or atomic) ratios. While this arrangement can provide various advantages, it also provides various challenges particularly in forming. While conventional alloys can comprise one principal element that largely governs the basic metallurgy of that alloy system (e.g. nickel-base alloys, titanium-base alloys, aluminum-base alloys, etc.) in an HEA each of the five (or more) constituents of HEAs can be considered as the principal element. Advances in production of such materials may open the doors to their eventual deployment in various applications. However, standard forming processes have demonstrated significant limitations in this regard. Utilization of the ShAPE type of process demonstrates promise in obtaining such a result.

In one example a "low-density" AlCuFe(Mg) Ti HEA was formed. Beginning with arc-melted alloy buttons as a precursor, the ShAPE process was used to simultaneously heat, homogenize, and consolidate the HEA resulting in a material that overcame a variety of problems associated with prior art applications and provided a variety of advantages. In this specific example, HEA buttons were arc-melted in a furnace under $10^{-6}$ Torr vacuum using commercially pure aluminum, magnesium, titanium, copper and iron. Owing to the high vapor pressure of magnesium, a majority of magnesium vaporized and formed $Al_1Mg_{0.1}Cu_{2.5}Fe_1Ti_{1.5}$ instead of the intended $Al_1Mg_1Cu_1Fe_1Ti1$ alloy. The arc melted buttons described in the paragraph above were easily crushed with a hammer and used to fill the die cavity/powder chamber (FIG. 4C), and the shear assisted extrusion process initiated. The volume fraction of the material filled was less than 75%, but was consolidated when the tool was rotated at 500 RPM under load control with a maximum load set at 85 MPa and at 175 MPa.

Comparison of the arc-fused material and the materials developed under the ShAPE process demonstrated various distinctions. The arc melted buttons of the LWHEA exhibited a cored dendritic microstructure along with regions containing intermetallic particles and porosity. Using the ShAPE process these microstructural defects were eliminated to form a single phase, refined grain and no porosity LWHEA sample.

Figure 5:
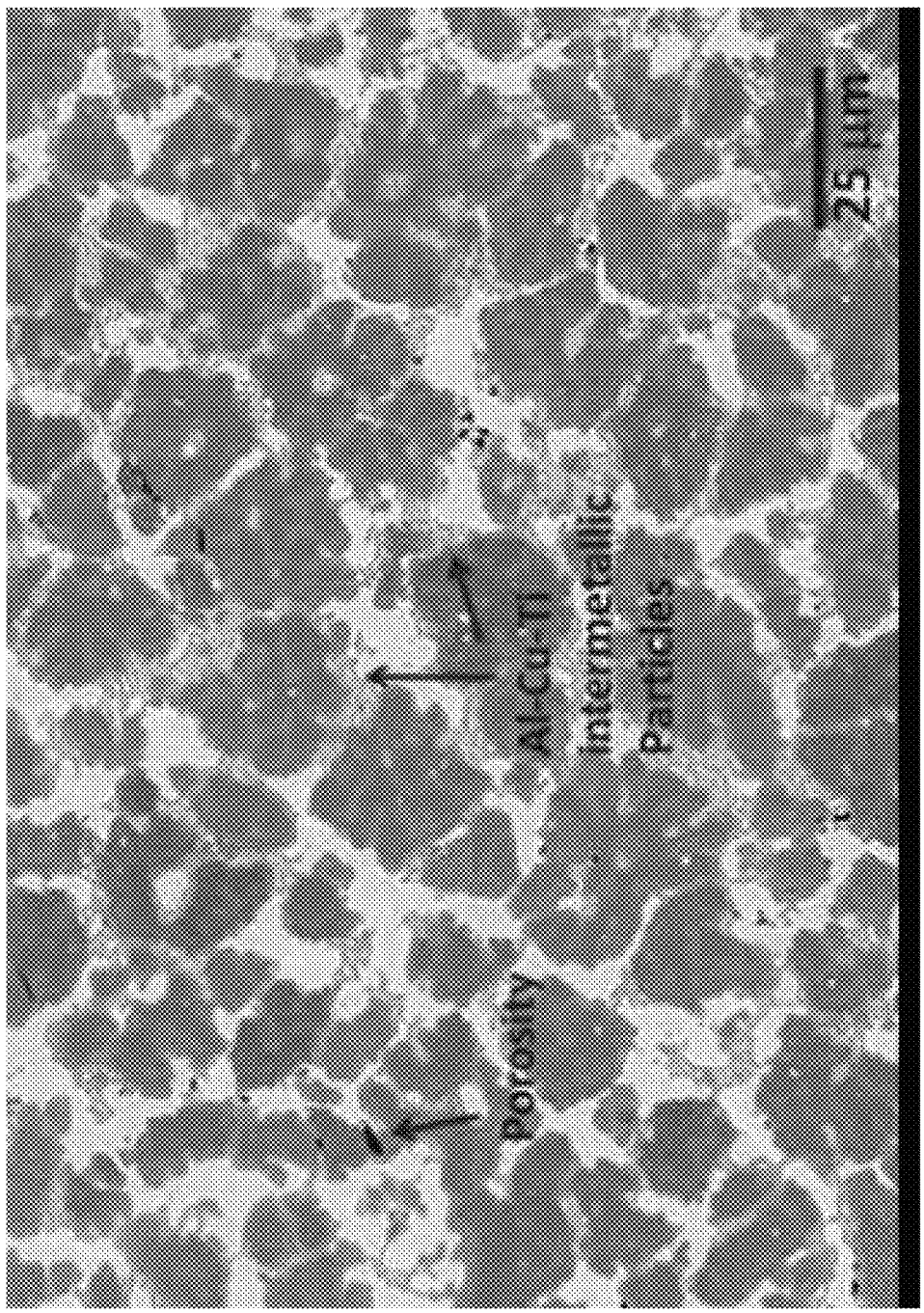
FIG. 5 shows BSE-SEM image of cross section of the HEA arc melted samples before ShAPE processing, showing porosity, intermetallic phases and cored, dendritic microstructure.

FIG. 5 shows the backscattered SEM (BSE-SEM) image of the as-cast/arc-melted sample. The arc melted samples had a cored dendritic microstructure with the dendrites rich in iron, aluminum and titanium and were 15-30 µm in diameter, whereas the inter-dendritic regions were rich in copper, aluminum and magnesium. Aluminum was uniformly distributed throughout the entire microstructure. Such microstructures are typical of HEA alloys. The inter-dendritic regions appeared to be rich in Al—Cu—Ti intermetallic and was verified by XRD as $AlCu_2Ti$. XRD also confirmed a $Cu_2Mg$ phase which was not determined by the EDS analysis and the overall matrix was BCC phase. The intermetallics formed a eutectic structure in the inter-dendritic regions and were approximately 5-10 µm in length and width. The inter-dendritic regions also had roughly 1-2 vol % porosity between them and hence was difficult to measure the density of the same.

Typically such microstructures are homogenized by sustained heating for several hours to maintain a temperature near the melting point of the alloy. In the absence of thermodynamic data and diffusion kinetics for such new alloy systems the exact points of various phase formations or precipitation is difficult to predict particularly as related to various temperatures and cooling rates. Furthermore, unpredictability with regard to the persistence of intermetallic phases even after the heat treatment and the retention of their morphology causes further complications. A typical lamellar and long intermetallic phase is troublesome to deal with in conventional processing such as extrusion and rolling and is also detrimental to the mechanical properties (elongation).

The use of the ShAPE process enabled refinement of the microstructure without performing homogenization heat treatment and provides solutions to the aforementioned complications. The arc melted buttons, because of the presence of their respective porosity and the intermetallic phases, were easily fractured into small pieces to fill in the die cavity of the ShAPE apparatus. Two separate runs were performed as described in Table 1 with both the processes' yielding a puck with diameter of 25.4 mm and approximately 6 mm in height. The pucks were later sectioned at the center to evaluate the microstructure development as a function of its depth. Typically in the ShAPE consolidation process; the shearing action is responsible for deforming the structure at interface and increasing the interface temperature; which is proportional to the rpm and the torque; while at the same time the linear motion and the heat generated by the shearing causes consolidation. Depending on the time of operation and force applied near through thickness consolidation can also be attained.

TABLE 2

Consolidation processing conditions utilized for LWHEA

| Run # | Pressure (MPa) | Tool RPM | Process Temperature | Dwell Time |
|---|---|---|---|---|
| 1 | 175 | 500 |  | 180 s |
| 2 | 85 | 500 | 600° C. | 180 s |

Figure 6B:
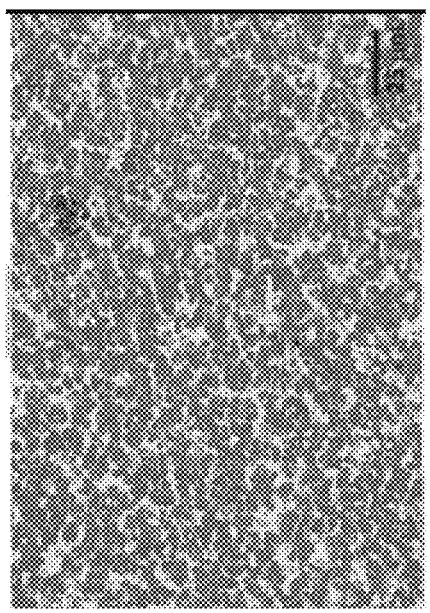
FIG. 6B shows BSE-SEM images halfway through the puck.
Figure 6D:
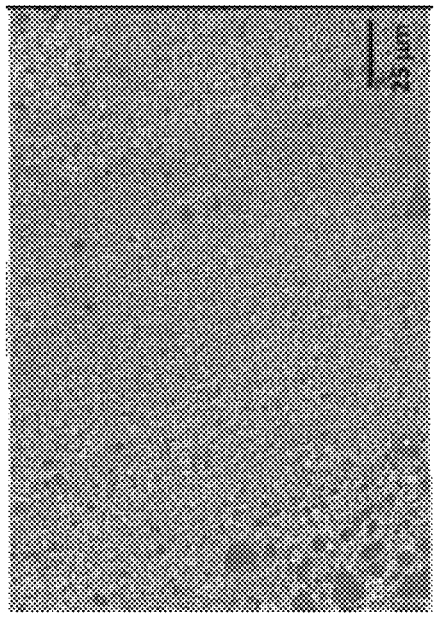
FIG. 6D shows BSE-SEM images of a high shear region.
Figure 6A:
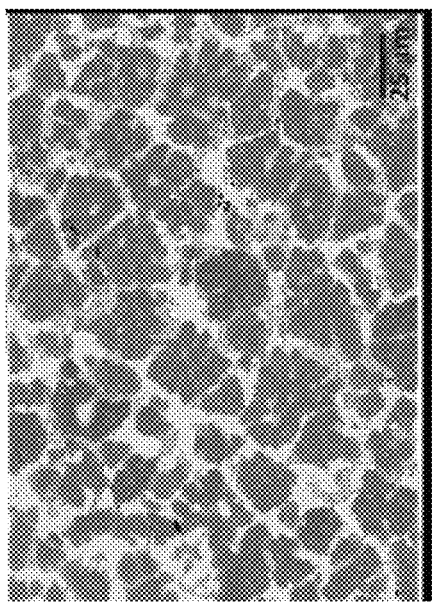
FIG. 6A shows BSE-SEM images at the bottom of the puck resulting from the processing of the material in FIG. 4C.
Figure 6C:
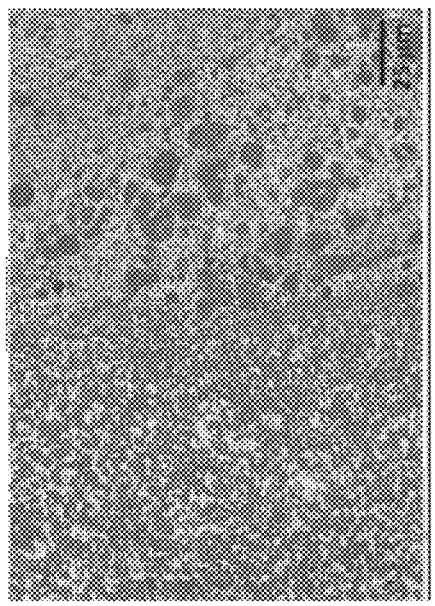
FIG. 6C shows BSE-SEM images of the interface between high shear region un-homogenized region (approximately 0.3 mm from puck surface).

FIGS. 6A-6D show a series of BSE-SEM images ranging from the essentially unprocessed bottom of the puck to the fully consolidated region at the tool billet interface. There is a gradual change in microstructure from the bottom of the puck to the interface where shear was applied. The bottom of the puck had the microstructure similar to one described in FIG. 5. But as the puck is examined moving towards the interface the size of these dendrites become closely spaced (FIG. 6B). The intermetallic phases are still present in the inter-dendritic regions but the porosity is completely eliminated. On the macro scale the puck appears more contiguous and without any porosity from the top to the bottom $3/4^{th}$ section. FIG. 6C shows the interface where the shearing action is more prominent. This region clearly demarcates the as-cast cast dendritic structure to the mixing and plastic deformation caused by the shearing action. A helical pattern is observed from this region to the top of the puck. This is indicative of the stirring action and due to the scroll pattern on the surface of the tool. This shearing action also resulted in the comminution of the intermetallic particles and also assisted in the homogenizing the material as shown in FIGS. 6C and 6D. It should be noted that this entire process lasted only 180 seconds to homogenize and uniformly disperse and comminute the intermetallic particles. The probability that some of these intermetallic particles were re-dissolved into the matrix is very high. The homogenized region was nearly 0.3 mm from the surface of the puck.

The use of the ShAPE device and technique demonstrated a novel single step method to process without preheating of the billets. The time required to homogenize the material was significantly reduced using this novel process. Based on the earlier work, the shearing action and the presence of the scrolls helped in comminution of the secondary phases and resulted in a helical pattern. All this provides significant opportunities towards cost reduction of the end product without compromising the properties and at the same time tailoring the microstructure to the desired properties. Similar accelerated homogenization has also been observed in magnesium and aluminum alloys during ShAPE of as-cast materials.

In as much as types of alloys exhibit high strength at room temperature and at elevated temperature, good machinability, high wear and corrosion resistance, such materials could be seen as a replacement in a variety of applications. A refractory HE-alloy could replace expensive super-alloys used in applications such as gas turbines and the expensive Inconel alloys used in coal gasification heat exchanger. A light-weight HE-alloy could replace aluminum and magnesium alloys for vehicle and airplanes. Use of the ShAPE process to perform extrusions would enable these types of deployments.

Figure 7:
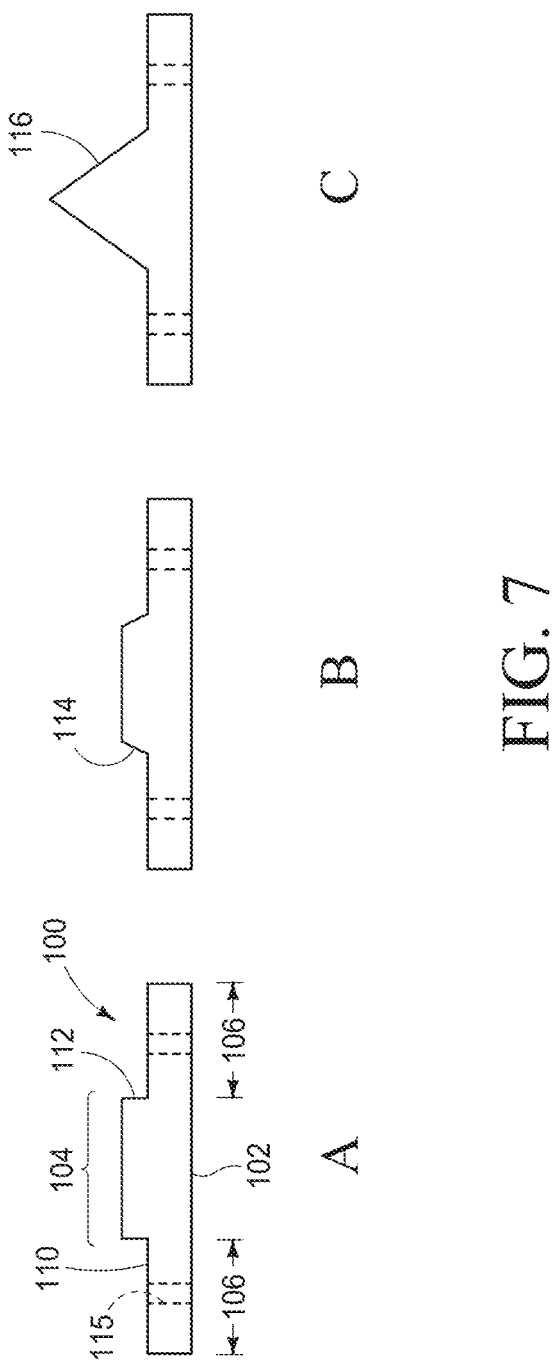
FIG. 7 is a depiction of a series of different scroll face configurations according to embodiments of the disclosure.

Referring next to FIG. 7, a device for performing shear-assisted extrusion is disclosed with reference to different implementations A, B, and C. In accordance with example implementations, device 100 can be a scroll having a scroll face 110 that includes an inner diameter portion 104 as well as outer diameter portions 106. Accordingly, these 3 scroll faces are shown in accordance with one cross section. As shown and depicted herein, viewed from the face they would have a circular formation. Accordingly, inner diameter portion 104 can extend beyond a surface 110 of outer diameter portion 106. Devices 100 can include apertures 115 arranged within the outer diameter portion and extending through the device toward a side 102 opposite the scroll face 110. As shown and depicted, inner portion 104 can be defined by the member 112 extending from surface 110. In accordance with alternative implementations, this member 112, as well as member 114 in implementation B and 116 in implementation C, may not occupy all of inner portion 104, but only a portion. In accordance with example implementations, portion 104 can be rectangular in one cross section, and with reference to implementation B, member 114 can be trapezoidal in one cross section, and with reference to implementation C, member 116 can be conical in one implementation. In each of these implementations, the member 112, 114, 116 can have sidewalls, and these sidewalls can define structures thereon, for example, these structures can be groves and/or extensions that provide for the transition of material away or towards the perimeter of the scroll face, which then would direct the material being processed through apertures 115.

Figure 8:
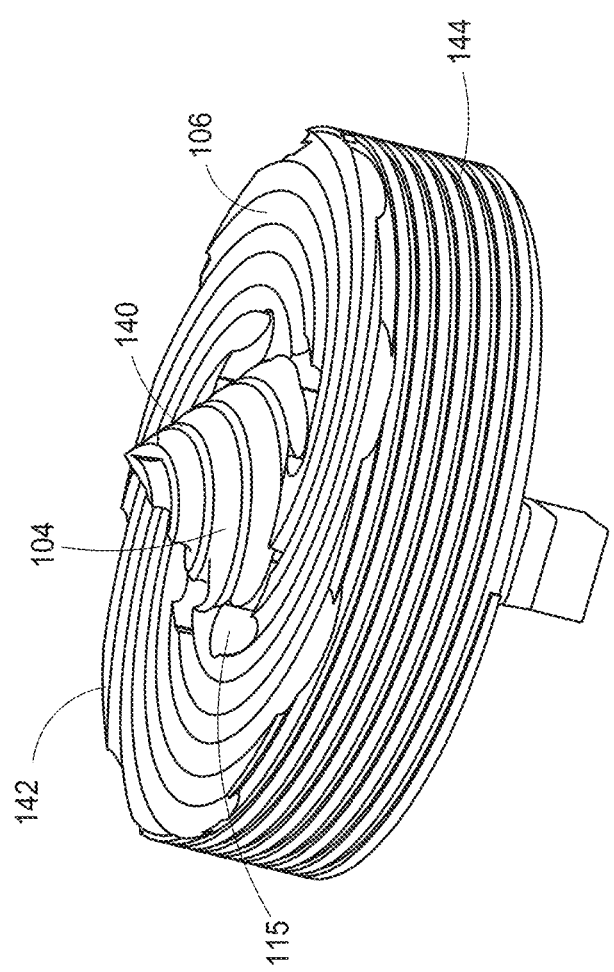
FIG. 8 is an isometric view of a scroll face tool according to an embodiment of the disclosure.

Referring next to FIG. 8, an example scroll face device is depicted in isometric view having inner portion 104 and outer portion 106. Accordingly, the device can include raised portions 140, 142, and/or 144. These portions can provide for a flow of material in a predetermined direction. For example, portions 140 can be configured to provide material to within apertures 115, while portions 142 can be configured to provide material to within the same apertures 115, thereby providing for flow of materials toward one another. Portions 144 can be provided for mechanicals needs as the device is utilized.

In accordance with example implementations, Shear assisted processing and extrusion (ShAPE™) can be used to join magnesium and aluminum alloys in a butt joint configuration. Joining can occur in the solid-phase and in the presence of shear, brittle $Mg_{17}Al_{12}$ intermetallic layers can be eliminated from the Mg—Al interface. The joint composition can transition gradually from Mg to Al, absent of $Mg_{17}Al_{12}$, which can improve mechanical properties compared to joints where $Mg_{17}Al_{12}$ interfacial layers are present.

As alluded to joining Mg—Al is difficult to perform without forming a brittle $Mg_{17}Al_{12}$ interfacial layer at the dissimilar interface. Example applications for material having been joined using the processes of the present disclosure include, but are not limited to:

Lightweight of rivets and bolts (i.e. Al shank with Mg head or vice versa)

Multi-material extrusion for structural members (tailor welded extrusions)

Mg—Al tailor welded blanks formed by slitting and rolling thin-walled tubes.

Corrosion resistant joints due to galvanically graded Mg—Al interface

Dissimilar Mg alloy or Al alloy joint pairs (i.e. AA6061 to AA7075)

Figure 9:
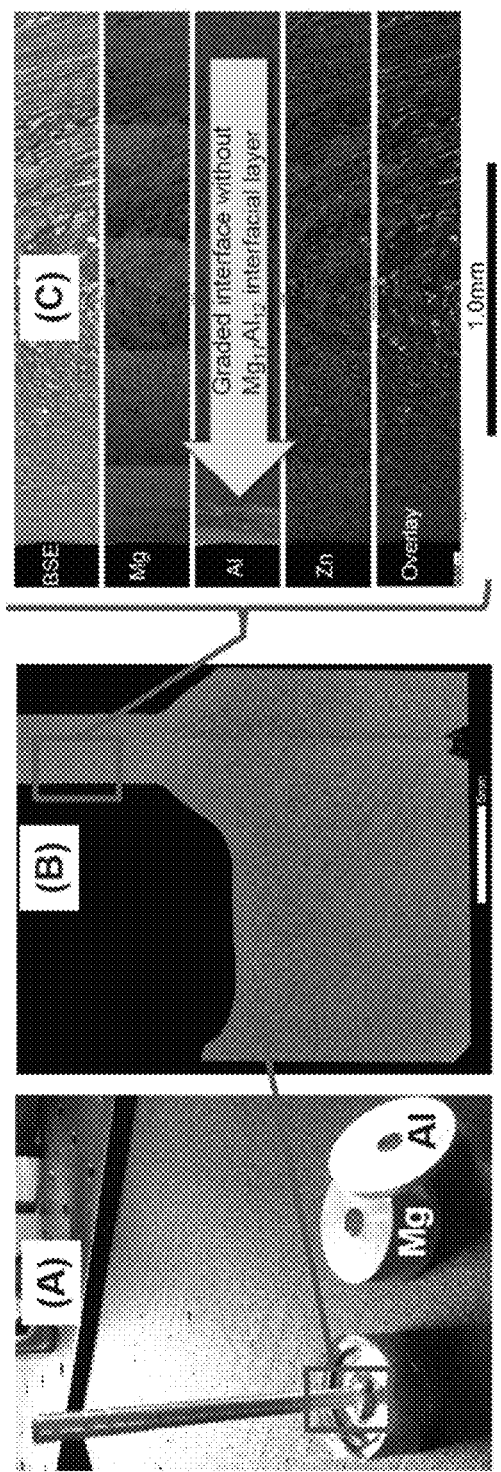
FIG. 9 is a series of photographs of extrusion of Mg—Al with consolidated cross sections, and in (B) showing gradient in composition between Mg and Al with absence of a $Mg_{17}Al_{12}$ interfacial layer at dissimilar interface (C).

In accordance with example implementations, materials can be engaged using the ShAPE technology of the present disclosure. For example, Mg alloy ZK60 can be joined to Al alloy 6061, without forming an $Mg_{17}Al_{12}$ interfacial layer. To accomplish this, the ShAPET process can be modified to mix ZK60 and AA6061 into a fully consolidated rod having an Al rich coating as a corrosion barrier. Referring next to FIG. 9, a 5 mm diameter rod extruded from distinct Mg and Al pucks is shown in FIG. 9 (A) with full consolidation shown in FIG. 9 (B), and FIG. 9 (C) shows a gradient in the composition (magenta Al map) between the Al rich surface and rod interior. Analysis showed the critical result that the $Mg_{17}Al_{12}$ β-phase did not exist as an interfacial layer, rather the IMC was highly refined and dispersed throughout the extrusion.

Figure 10:
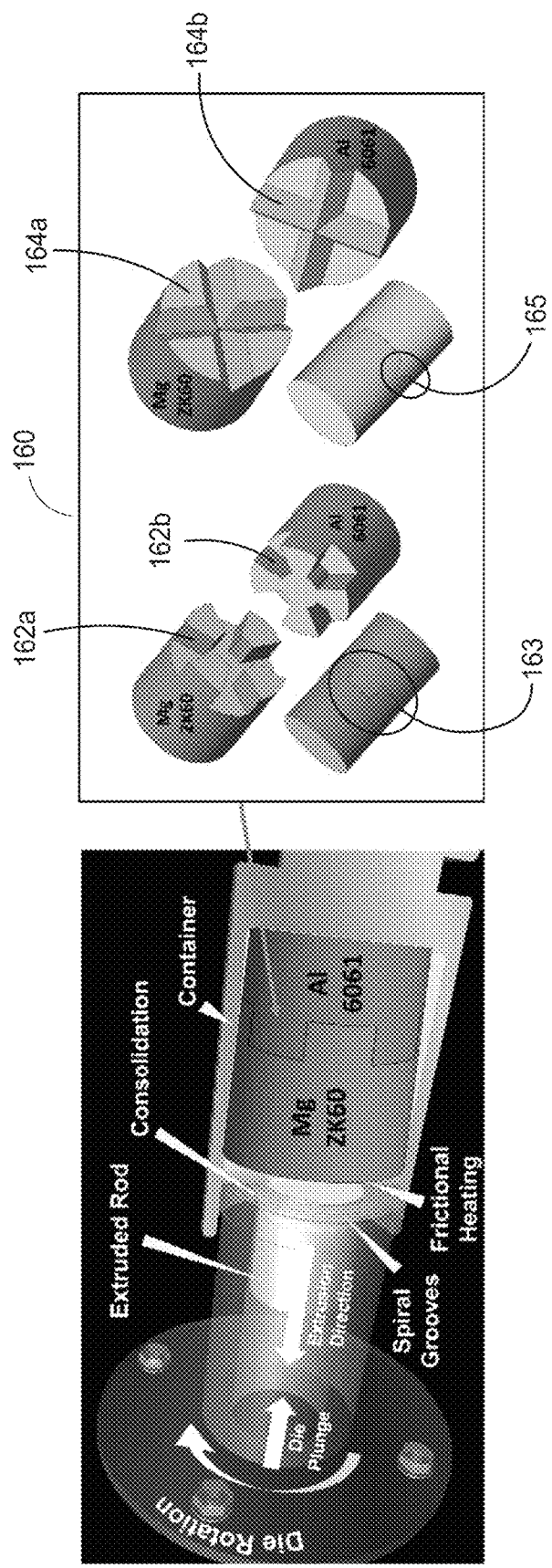
FIG. 10 is a depiction of an example extrusion assembly according to an embodiment of the disclosure and also a depiction of feedstock material engagements and/or feedstock interfaces according to an embodiment of the disclosure.
Figure 11:
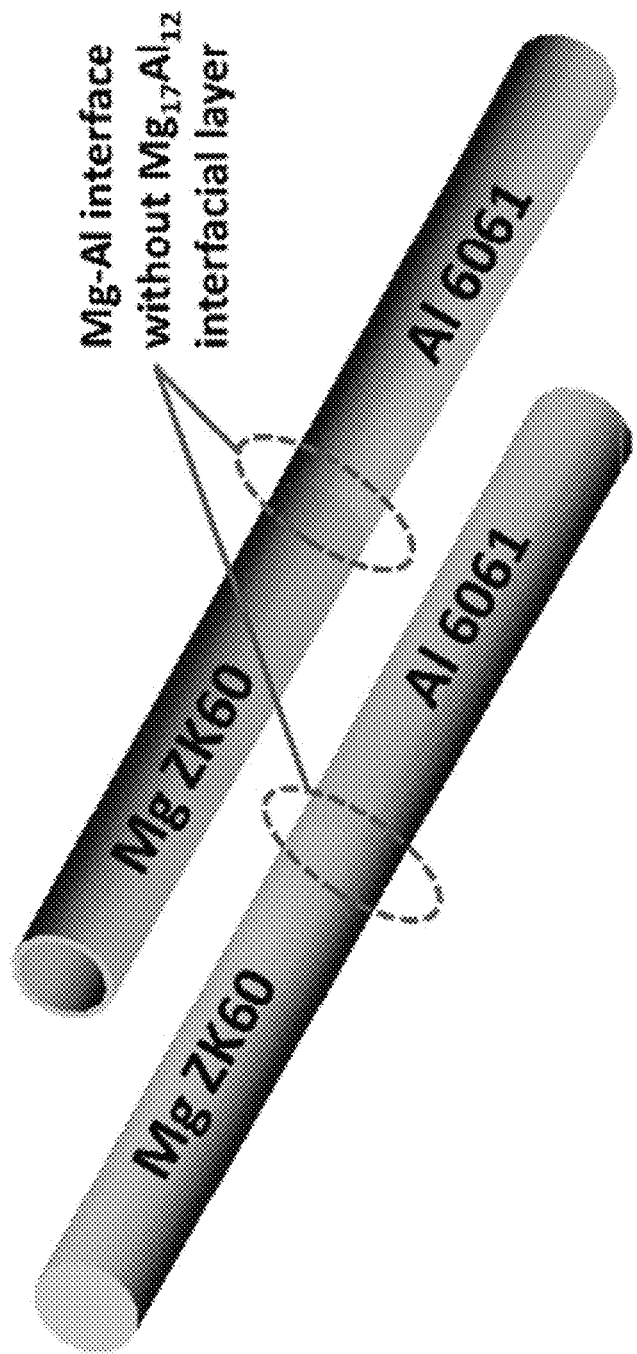
FIG. 11 is a depiction of extruded material having no $Mg_{17}Al_{12}$ interfacial layer.

Referring to FIG. 10, an example solid-phase method for joining Mg to Al extrusions in a butt configuration is shown. In accordance with example implementations, separate Mg and Al billets can be interlocked to form a single billet that will be extruded using the ShAPE process for example. As the die rotates and plunges to the right, an Mg alloy extrusion forms as the material is consumed. The rotating die then penetrates into the interlocking region of the two feedstock materials where Mg and Al are mixed and extruded simultaneously to form the dissimilar joint. Once the die penetrates past the interlocking region of the two feedstock materials, an Al alloy extrusion forms as material continues to be consumed. As shown in FIG. 11, a multi-material rod or hollow-section extrusion can be fabricated absent of a brittle $Mg_{17}Al_{12}$ interfacial layer is shown. The method can be used for rods and/or tubes of varying diameters.

The geometry of the interlocking region can be tailored to control the composition and transition length of the Mg—Al joint region. The geometric possibilities are many but two examples are shown in window 160 in FIG. 10; one abrupt (flat pie shaped interface having complimentary portions 162a and 162b that interlock to form interlocking region 163), and one gradual (triangular spokes interface having complimentary portions 164a and 164b that interlock to form interlocking region 165). The most abrupt interface can be achieved with a flat interface between the Mg and Al billets.

Figure 12:
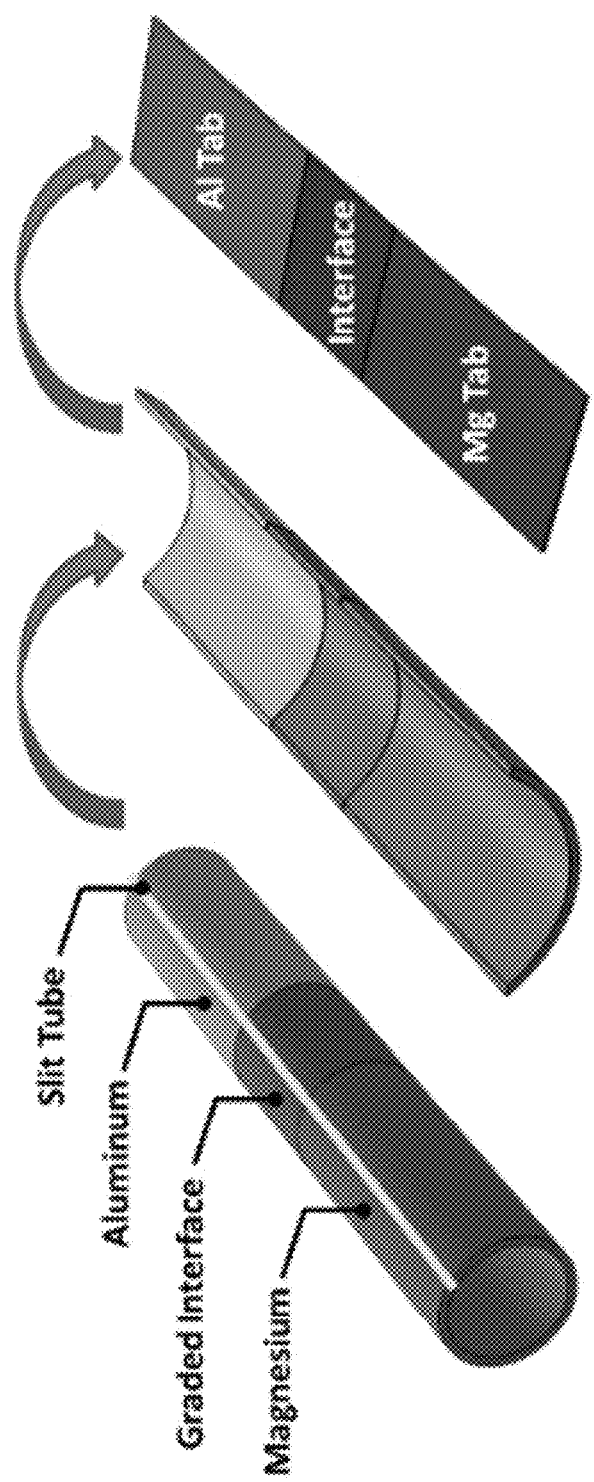
FIG. 12 is a depiction of extrusion material having a graded interface layer prepared using engaged feedstock materials according to an embodiment of the disclosure.
Figure 13:
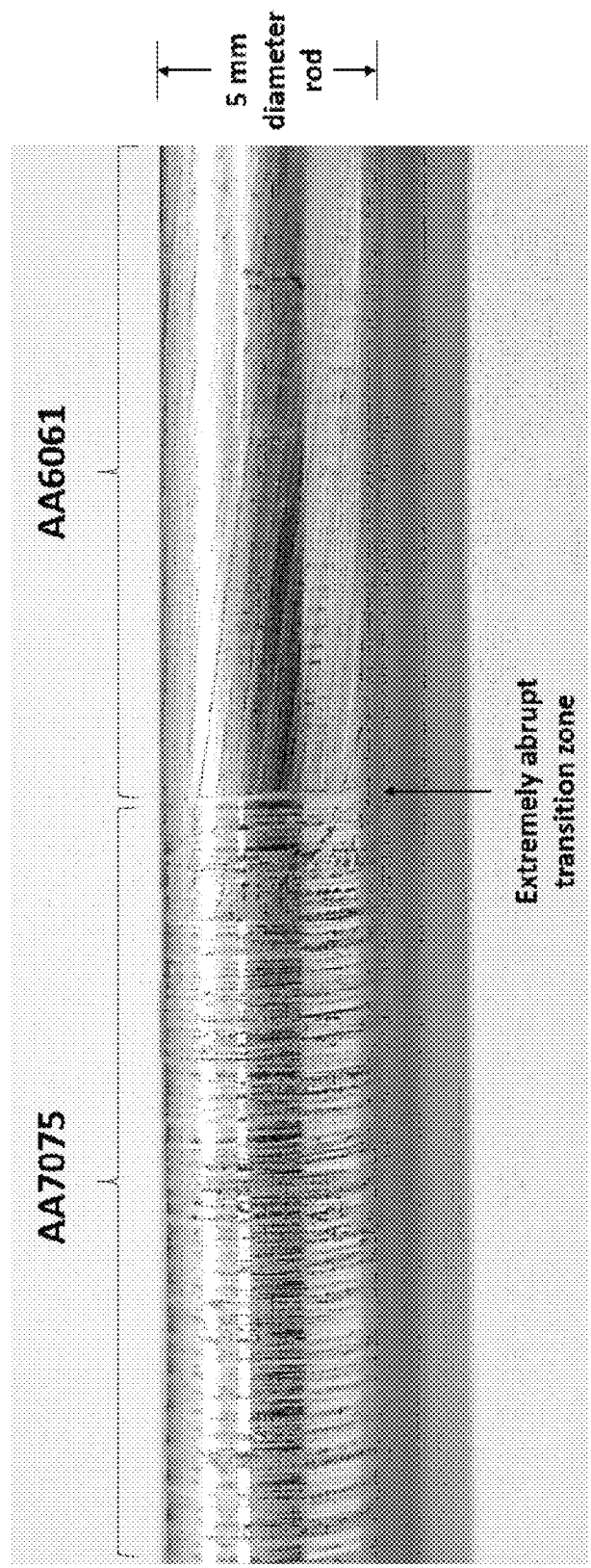
FIG. 13 is a depiction of two components, AA7075 and AA6061, bonded at an abrupt transition layer according to an embodiment of the disclosure.

In accordance with at least one implementation, with triangular spoked interlocks 165, the composition of Mg in Al goes from 0% to 100% at a rate depending on the number of spokes and angle of the triangle's vertex. This method has been used to demonstrate a transition length of 37 mm to illustrate the concept. Because the joint is formed by mixing in the solid phase, an $Mg_{17}Al_{12}$ interfacial layer will not form. Rather, a gradient in chemical composition and also possibly grain size will form across the dissimilar interface with the intense shear refining and dispersing any $Mg_{17}Al_{12}$ second phase formations. The composition gradient at the Mg—Al interface has a secondary benefit of also being a galvanically graded interface which can improve corrosion resistance. Referring to FIG. 12 Mg—Al tailor welded blanks are shown, with a galvanically graded interface, made by slitting and rolling tubes. In accordance with example implementations, rolling of 75 mil thick ZK60 tubes down to 3 mil foils can be achieved using these tailor welded blanks. Referring to FIG. 13, using interlocked feed material of AA7075 and AA6061, using the methods of the present disclosure, AA7075 can be butt jointed with AA6061 as shown with an abrupt (pictured) or extended transition length.

Accordingly, an extrusion process for forming extrusion of a desired composition from a feedstock is provided. The process can include providing feedstock for extrusion, and the feedstock comprising at least two different materials. The process can further include engaging the materials with one another within a feedstock container, with the engaging defining an interface between the two different materials as described herein. The process can include extruding the feedstock to form an extruded product. This extruded product can include a first portion that includes one of the two materials bound to a second portion that can include one of the other two materials.

Accordingly, the interface between the two materials can interlock the one material with the other material and the geometry of the interlock can define a ratio of the two materials where they are bound. This ratio can be manipulated through manipulating the geometry of the engagement. For example, there could be a small amount of one of the materials entering into a perimeter defined by the other of the two materials, and vice versa. In accordance with example implementations and specific examples, one of the materials can be Mg and the other can be Al. The process can also include where the one material is Mg ZK60 and the other material is Al 6061. Accordingly, there could be one material that has one grade and another that has another grade. For example, the material can be AA7075 and the other material can be AA6061. In accordance with example implementations, these billets can be part of the feedstock and the billets can be interlocked.

The extrusion feedstock materials may have a geometry that defines a ratio of the two materials when they are extruded as bound extrusions. The feedstock materials can be aligned along a longitudinal axis, and according to example implementations this can be the extrusion axis. The interlock of the billets can reside along a plane extending normally from the axis, and accordingly, the plane can intersect with both materials.

In order to improve the formability of magnesium sheet materials, the inventors believe that the grain sizes should be less than 5 microns and/or a weakened texture is desirable. It has been demonstrated that the novel Shear Assisted Processing and Extrusion (ShAPE) technology can not only attain the aforementioned microstructure but also help with the alignment of the basal planes (i.e. texture). This technology can also reduce the size and uniformly distribute the second phase particles, which are believed to impede the formability of sheets. In accordance with example implementations, extruded tubes of Mg can be slit open and rolled into the sheet. Extruded tubes of magnesium (ZK60 alloy) using the ShAPE process can be provided which can be 50 mm in diameter and 2 mm in wall thickness, or another diameter and wall thickness. These tubes can be slit open in a press and then rolled parallel to the extrusion axis, for example.

Figure 14:
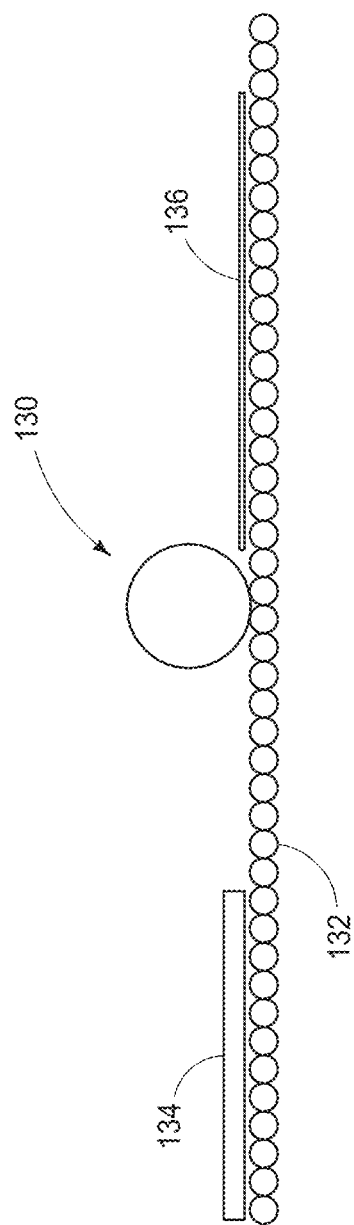
FIG. 14 is an example rolling mill assembly according to an embodiment of the disclosure.

Referring next to FIG. 14, in particular embodiments, Mg sheets can be provided that are not common in mass produced vehicles, for example. The production of these sheets can include the use of rolling of ShAPE produced and open extruded tubes. In accordance with example implementations, and with reference to FIG. 14, an example rolling mill 130 is shown. In accordance with example implementations, rolling mill 130 can have conveyer 132 but have a sheet 134 of a first thickness and after passing through mill 130, the sheet 134 can be a sheet 136 of a second thickness. In accordance with example implementations, this rolling can be cold rolling, hot rolling, or twin rolling. ShAPE extrusions such as ShAPE tubing can provide a feedstock for subsequent rolling that can provide differentiated and/or advantageous grain size, second phase size and distribution, and/or crystallographic texture when compared to conventional feedstocks for rolling.

Referring next to FIG. 15, a series of depictions are shown demonstrating a ShAPE fabricated Mg ZK60 tube and the open tube thickness as well as the rolled tube rolled hot to a desired thickness. In accordance with example implementations, the rolled tube can be annealed between passes at between 420° C. and 450° C. for 5 minutes, and can be performed without a twin roll casting if desirable.

Referring next to FIGS. 16A and 16B, in accordance with example implementations and as described herein, these Mg billets such as the ZK60 billet can be produced about a chilled mandrel as disclosed herein, with frictional heat to produce a tube having an extrusion direction and basal planes about that extrusion direction. In accordance with example implementations, these materials can be anisotropic which can make them quite robust.

Referring next to FIG. 17, a series of passes are shown from zero passes all the way to 16 passes of a Mg sheet. In FIG. 18 a 0.005 inch thickness sheet is shown and demonstrated the flexibility and robustness in the accompanying two figures. In accordance with example implementations and with reference to FIG. 19, reduction per rolling pass has been plotted, and as can be seen, after about 5 rolling passes, the thickness remains uniform, but after 10 rolling passes, there can be a reduction in thickness of up to 60%. Such large reductions per pass are difficult to impossible to achieve with hot rolling of conventional Mg feedstocks intended for subsequent rolling operations.

Regarding FIGS. 20-38, described embodiments of the present disclosure provide ShAPE processes, feedstock materials, materials, conductive materials and/or assemblies. The solid phase processing of the present disclosure can provide a copper material embedded with graphene distributed homogeneously and/or isotropically throughout material. Copper-graphene material of the present disclosure can demonstrate a material architecture wherein the graphene is present predominantly at the grain boundaries, but may also be found in other locations such as grain interiors. The interface between the graphene and copper is engineered during processing such that they can have minimal lattice mismatch.

Through a combination of these elements, scattering of electrons can be minimized. During operation, the carriers can move through the conductive material at subscribed velocities corresponding to the temperature of operation. When the carriers encounter graphene, owing to the favorable interfacial properties, the carriers can traverse the energy barrier and enter the additives easily where they move with higher velocities. This ability of the carriers to move through higher conductivity additives with minimal scattering can provide improved electrical properties at higher temperatures.

The high conductivity materials of the present disclosure, particularly copper, can have broad application in industry including all electric machines as well as the electronics, power conversion, energy transport and other electric applications. For example, when square bar wires for stator windings are made by this process, the way automotive traction drives are constructed, sized or powered can change dramatically. High conductivity wire for stator windings could impact permanent magnet motors, where there are strong incentives to improve motor performance in light of the slow progress towards the 400 mile range battery pack. The materials of the present disclosure can have application in small high power induction motors for starters, motors to power ancillary loads (pumps, hvac, etc), or actuators in transmission or driveline. Another industrial application can include the fabrication of shorting bars for the rotors of induction motors. In this application the metal-NCCF ShAPE extrusion can have a noncircular cross-section, and the bars are joined to end caps to form the inner "squirrel cage" of a typical induction rotor assembly. The metal-NCCF ShAPE extrusion shorting bars can lead to increased motor efficiency.

In accordance with example implementations, bulk size conductive solid material mixtures of the present disclosure can have electrical conductivity superior to pure copper. Example implementations provide C10100 pure copper billet and CVD monolayer graphene on copper foil prepared and assembled as a feedstock material for ShAPE. Using ShAPE, copper metal and/or alloys and graphene can be deformed, mixed, and extruded as a Copper-Graphene composite wire with 1 m length and 2.5 mm diameter. The electrical conductivity measured by 4-probe method indicates this wire has 104.8% IACS when 6 ppm graphene is added. Optical and Electron Microscopy show the wire has good integrity with an isotropic crystallographic orientation. The graphene can be barely detectable under Transmission Electron Microscopy due to the low content and monolayer morphology. However, atom probe tomography reveals that the monolayer graphene is distributed along the grain boundaries of the copper substrate predominantly.

Referring to FIGS. 20-21, in accordance with example implementations, a process and assembly 300 is shown for the shear assisted extrusion of a metal and NCCF material according to an embodiment of the disclosure. In accordance with example implementations, the process and assembly can include a die tool 302 that is operatively engaged with a feedstock material ring 304. Within the feedstock material ring 304 can be feedstock material 306, and utilizing the processes and assemblies of the present disclosure, an extrusion product or extrudate material 308 can be created. Applying the rotational shearing force and an axial extrusion force to the feedstock material using the die tool can deform at least a portion of the feedstock material and mixes the deformed material.

Accordingly, shear-assisted extrusion processes for forming Metal-NCCF extrusions are provided. The metal of the feedstock, the extrudate, and/or the solid conductive material mixture can include a material that demonstrates enough plasticity to be extruded by ShAPE. Example extrudable metals and/or alloys, and/or mixtures can include Cu, Al, Mg, Fe, Ti and NI and/or alloys, and/or mixtures that include these metals. The NCCF of the feedstock, the extrudate, and/or the solid conductive material mixture can include one or more of graphene, carbon nanotubes, nanographite, buckyballs, nano-diamond, carbon quantum dots or any other form of crystalline carbon materials. The NCCF can be at least 1 ppb by weight of the feedstock, the extrudate, and/or the solid conductive material mixture.

In accordance with example implementations, the feedstock, the extrudate, and/or the solid conductive material mixture can include the metal Cu and the NCCF graphene.

In accordance with an example implementation, copper/graphene billet 306 of a C10100 puck and assembled graphene coated Cu foils 310 can be used to manufacture the Cu/Graphene (G) composites. C10100 (or 101) cooper, which is the Oxygen free high conductivity Copper (OFHC), has a high purity 99.99% and about 101% IACS. Cylindrical copper puck 306 can have a pocket in the center and filled with pure copper foils with CVD deposited monolayer graphene 310. Referring to FIGS. 22-23, foils 310 can be cut into desired shapes 312 and then filled into the pocket of the copper puck as shown in FIG. 23. The puck housing the foils can be placed in a steel ring 304. The carbon content of this type of sample can range from 0 to 0.0006 wt %.

In accordance with example implementations, a ShAPE feedstock material is provided that can include a metal and NCCF. The feedstock material can define a billet, and the billet can further include portions of NCCF. The portions of NCCF can be deposited on portions of metal, the NCCF can be dispersed within the metal, the NCCF can be provided in openings within the metal, and/or the feedstock materials can be provided as particles of metal and/or NCCF.

In accordance with example implementations of the present disclosure, the copper and graphene in the form of chips, particles, discs, nuggets, films, powders or foils can be mixed and extruded with the copper billet via, ShAPE, described herein. Accordingly, utilizing ShAPE processes, an extrudate can be formed that includes the metal and NCCF. For example, a 2.5 mm diameter wire can be formed. Referring to FIG. 24, process temperatures can be monitored by a K-type thermocouple located at 0.5 mm away from die tool face and 4 mm offset from the extrusion axis radially. Additionally, force, power, and torque exerted during the friction extrusion process can be monitored by sensors built into the machine. Wire samples can be made with varying graphene content as shown in Table 3 below. The 0 wt. % graphene sample, also referred to as the Cu-only or control sample, can be manufactured as described above; for example, the copper puck was loaded with Cu foils that did not have any graphene coating.

TABLE 3

| Sample ID | Graphene content (ppm by weight) |
|---|---|
| Control | 0 |
| Cu/G1 | 1.5 |
| Cu/G2 | 2 |
| Cu/G3 | 6 |

Referring next to FIGS. 25-26, example configurations of the feedstock materials as well as different cross sections of materials in process are shown. As can be seen in these figures, the microstructure of the materials in process are characterized, and they are characterized in accordance with the following microstructure characterization and graphene detection. With reference to FIGS. 25-26, pieces 312 can be oriented in vertical and/or horizontal stacks, and the distinguishing characteristics noted with reference to the microstructure and graphene detection.

The extrudate materials, for example, the Cu-graphene wires can be cut transversely and longitudinally for metallography inspection. The puck can also be cut vertically to show the material flow and the state of consolidation of the remnants. These samples can be ground and vibrationally polished using 0.05 µm colloidal silica media. Optical micrographs can be obtained using an Olympus BX51M optical microscope. To identify grain structure and elementary distribution, the transverse cross-sections can be further examined used a JEOL7600F field emission SEM equipped with an Oxford Instruments 170 mm2 X-Max energy dispersive spectrometer (EDS) and Symmetry electron backscatter diffraction (EBSD) CMOS detector by EDS (Energy Dispersive Spectroscopy) and EBSD (Electron backscatter diffraction).

To detect the NCCF, in this case, graphene, Atom Probe Tomography (APT) can be utilized: APT sample preparation can be performed using a FEI Helios dual beam focused ion beam-scanning electron microscope (FIB-SEM) by first depositing a protective Pt capping to protect the material from Ga ion damage during FIB milling. A cantilever can be extracted from the base alloy, pieces of which can be mounted onto a commercial Si micropost array, and individually shaped into needle-shaped APT specimens. A CAMECA local electrode atom probe (LEAP) 4000X HR system equipped with a 355 nm wavelength ultraviolet (UV) laser can be used to acquire APT data with the following user-selected parameters: 100 pJ/pulse laser energy, 100 kHz pulse repetition rate, 35 K specimen base temperature, and 0.005 detected ions/pulse detection rate. The analysis chamber can be kept at a less than $2 \times 10^{-11}$ Torr. The detector efficiency of the APT used in this work can be approximately 36%. Data acquired can be reconstructed and analyzed using the Interactive Visualization and Analysis Software (IVAS), version 3.8.4 by CAMECA.

Referring next to FIGS. 27-29, cross sectional analysis of extruded products of feedstock materials as shown in the figures are depicted. As can be seen, these feedstock materials can generate extruded products that include nanocrystalline carbon film materials or nanocrystalline carbon along the grain boundaries of the metals. This nanocrystalline carbon film can be isotropically distributed and/or homogeneously distributed throughout the extruded product.

FIG. 29 depicts the optical micrographs of longitudinal and transverse sections of the Cu/G sample with 6 ppm graphene as well as Cu-only sample. Given that the feedstock for this material included foils as described, porosity was anticipated to be discovered in the microstructure. Contrary to that, the optical microscopy results show that the porosity in the Cu/G and the Cu-only samples was minimal. Accordingly, it is not necessary that the feedstock material be completely solid and free of voids, therefore particles can be utilized.

Smaller grains can be seen towards the wire surface while the center of the wire was made of comparatively larger grains. FIG. 29 also shows the scanning electron microscope image of the Cu/G sample with 6 ppm graphene content. Owing to the minute quantities of the additive, it was not evident in the SEM image. The copper grains in the composite demonstrated a bimodal distribution with a banded structure, typical of friction extrusion microstructures. The average grain size was over 100 µm and a random texture was observed. However, due to the low carbon content, <6 ppm it is not possible to identify the carbon via OM and SEM.

Referring next to FIGS. 30-35, the mechanical properties of the extruded product of the present disclosure are demonstrated and depicted. Accordingly, ultimate tensile strength, % elongation, yield strength of the samples can be determined in accordance with ASTM E8. A length of 100 mm of the wire samples can be attached to the clamps of an MTS load frame. The clamped sample can be loaded steadily and strained at a rate of 0.1 mm/mm until fracture. Stress derived from tensile load can be divided by cross-section area. The gage area can be painted with speckle pattern for capturing the real-time strain using digital image correlation. The UTS of the extruded material is lower than that of a copper only sample. The yield strength and elongation of the extruded material is higher than the copper only sample.

Referring next to FIGS. 36-37, both conductivity and resistivity data are depicted.

Electrical conductivity of the solid material mixtures of the present disclosure, for example, the Cu/G composite wires can be measured in accordance with ASTM B193. A length of 300 mm of the sample wire can be suspended with clamp under slight tension across a custom-designed aluminum base. DC current (/) can be provided to the sample using a Keithley 2260B-30-72 DC power supply with an accuracy of 0.1%±70 mA via gold plated leads in a series configuration. A Keithley 2182A nano-voltmeter with an accuracy of ±60 ppm of reading+4 ppm of range can be attached to the sample in parallel configuration to measure a voltage drop (V) across a length (/) along the sample. The diameter of sample wires can be measured using a Keyence LS-7601 optical micrometer with a measurement uncertainty of ±3 μm. Sample lengths can be measured with a Mitutoyo 500-193 digital caliper with a device uncertainty of ±0.01 mm, with a measurement uncertainty taken as ±0.5 mm. The voltage drop across the voltmeter leads can then be used in conjunction with the set current value to determine the electrical conductivity of the sample according to Ohm's law.

FIG. 36 shows the electrical conductivity of Cu/G samples with 0-6 ppm graphene as a function of increasing graphene content. The uncertainty in the electrical conductivity measurement was calculated to be 0.195 MS/m (0.333% IACS) according to the RSS method. The control sample (Cu-only sample), which was manufactured in a manner similar to the Cu/G samples except without the graphene additives, demonstrated an electrical conductivity of 58.15 MS/m (100.25% IACS) which is comparable to that of standard annealed copper. The Cu/G materials demonstrated electrical conductivity higher than that of Cu-only control samples. The conductivity of all the samples can increase monotonically over that of the Cu-only sample. The highest electrical conductivity of 60.80 MS/m (104.82% IACS) demonstrated by the Cu/G sample with only 6 ppm (by weight) of graphene, which is 4% improvement over that of the Cu-only sample.

The procedures described in ASTM B84 can be used to determine the temperature coefficient of resistance of the friction-extruded samples. The wires can be coated with a black graphite paint with an emissivity of ~0.99. DC current ranging from 10-60 A in intervals of 10 A was provided to the sample to increase its temperature due to Joule heating. An FLIR A325sc infra-red thermal camera with a measurement uncertainty of ±2° C. was utilized to determine the highest steady-state temperature ($T_s$) of the wires corresponding to a current level. Steady-state temperatures were assigned when the change in temperature with respect to time was less than 0.1° C./s (dT/dt<0.1° C./s). Voltage drop across a sample length of 140-150 mm was measured at each current level after steady-state temperature was achieved. Electrical resistance (R), calculated using sample current (/) and voltage drop (V), was plotted against the corresponding $T_s$. The slope of resistance as a function of steady state temperature was calculated as $dR/dT_s$ for each test sample. Accordingly, TCR was determined per ASTM B84 at 20° C.

FIG. 37 displays the resistivity of the Cu/G samples as a function of temperature based on which the temperature coefficient of resistance (TCR) of the material was determined. Results show that while the TCR of the Cu/G samples was higher than that of the Cu-only sample, their resistance, and subsequently their conductivity was better than that of the control sample until around 200° C.

Finally, with respect to FIG. 38, atom probe tomography (APT) samples were lifted out on the grain boundary in the Cu/G composite sample with 6 ppm graphene content from the region of interest The inset in the figure shows the needle specimen used for APT analysis consisting the grain boundary in the center. The APT reconstruction is displayed in where the C atoms are shown to be located along the grain boundary. For further analysis, a 20% iso-concentration surface was used to delineate C rich regions from the remaining regions as shown. A one-dimensional composition profile across the region marked by the cylinder in the inset presents the compositional changes across various regions of the reconstruction. The composition profile across the grain boundary shows C enrichment on both sides (left- and right-hand side) of grain boundary. The elongated carbon rich phase on the right-hand side of the grain boundary, which may correspond to sheared graphene, consisted of C, O and Cu in a ratio equal to 3:3:1.

More specifically, FIG. 38 provides: Atom probe tomography (APT) results from the shear assisted processing and extrusion of Cu and graphene. (a) The FIB lift out was done along a grain boundary. The region of interest is highlighted by a white rectangle in the back scattered electron diffraction SEM image. The inset to the figure shows the SEM image of needle shaped specimen prepared for APT analysis where the grain boundary can be seen in the center of the needle. (b) APT reconstruction showing the distribution of various ions (Cu, C and O). (c) APT reconstruction showing C (brown) and O (cyan) ions along with a 20 at % C iso-surface delineating the C rich regions. (d) A one-dimensional compositional profile along the cylinder shown in the inset figure.

Accordingly, the present disclosure provides a conductive solid material mixture that can include a metal and NCCF. Portions of the material mixture can have a preferred crystallographic orientation or an isotropic crystallographic orientation in relation to the nanocrystalline carbon film. The metal can include one or more of Cu, Al, Mg, Fe, Ti, and/or Ni. The NCCF can include one or more of graphene, carbon nanotubes, nanographite, graphite, buckyballs, carbon quantum dots, nano-diamond or any other such crystalline carbon materials.

Additionally, assemblies relying in part on conductivity are also provided. The assemblies can include the conductive solid material mixtures of the present disclosure. Example assemblies can be overhead conductors, busbars, undersea cables, umbilicals, motors, motor parts, inverters, transformers, electrical signal contacts, electronic interconnects, and generators.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A shear-assisted extrusion process for forming Metal-NCCF extrusions, the process comprising:
    using a die tool, applying a rotational shearing force and an axial extrusion force at an interface of a scroll face of the die tool and a face of a feedstock material, the scroll face of the die tool oriented in a direction generally perpendicular to the axial extrusion force, and comprising spiral grooves to direct plasticized feedstock material toward openings in the scroll face of the die tool;
    wherein the feedstock material comprises a metal and a NCCF (NanoCrystalline Carbon Forms), wherein:

the metal comprises one or more of Cu, Mg, Al, Fe, Ti, and/or Ni; and the NCCF is deposited on the metal; and wherein the process comprises extruding a mixture comprising the metal and the NCCF through the openings in the die tool to form a Metal-NCCF extrusion comprising a homogeneous distribution of NCCF particles throughout the metal-NCCF extrusion; and wherein the scroll face of the die comprises a member extending from a center of the scroll face of the die tool.

2. The process of claim 1 wherein the NCCF comprises chemical vapor deposited (CVD) graphene or reduced graphene oxide.

3. The process of claim 2 wherein the NCCF is at least 1 ppb by weight of the feedstock material.

4. The process of claim 1 wherein the applying the rotational shearing force and the axial extrusion force to the feedstock material deforms at least a portion of the feedstock material and mixes the deformed at least a portion of the feedstock material.

5. The process of claim 1 wherein the feedstock defines a billet.

6. The process of claim 5 wherein metal portions with deposited NCCF are located in openings within surrounding metal of the feedstock.

7. The process of claim 5 wherein the feedstock comprises particles, films, discs, nuggets, chips, foils, or powders of the metal upon which the NCCF is deposited.

8. The process of claim 1 wherein the Metal-NCCF extrusion is a conductive solid material mixture comprising the metal and the NCCF.

9. The process of claim 1 wherein the mixture is extruded along a mandrel to form a hollow Metal-NCCF extrusion.

10. The process of claim 9 wherein the openings are configured to convey plasticized feedstock material to the mandrel.

11. The process of claim 1, wherein the mixture is extruded to form the Metal-NCCF extrusion including establishing a specified crystallographic orientation based on an extrusion process parameter comprising at least one of a specified rotational velocity or a specified axial force.

12. The process of claim 11, wherein the specified crystallographic orientation comprises an isotropic crystallographic orientation.

13. The process of claim 11, wherein the shear-assisted extrusion process results in a crystallographic orientation with increased isotropy versus that of the feedstock material.

14. The process of claim 1, wherein the scroll face comprises a plurality of grooves in a circular formation terminating at respective openings.

15. The process of claim 14, wherein the plurality of grooves are configured to direct plasticized material from a first location on the interface between the feedstock material and the scroll face, through the openings defined within the scroll face, and to a second location upon a die bearing surface of the die tool.

16. The process of claim 1, wherein the metal is one of Ni, Cu, Al, or Mg.

17. The process of claim 1, wherein the NCCF is incorporated into the feedstock material in a cavity of the feedstock material.

18. The process of claim 10, wherein the cavity of the feedstock material comprises Cu foil.

19. The process of claim 18, wherein the Cu foil includes a chemical vapor deposited (CVD) graphene monolayer.

20. The process of claim 1, wherein the NCCF is incorporated into the feedstock material on portions of Cu metal in a cavity of the feedstock material.

21. The process of claim 20, wherein the portions of Cu metal in the cavity include a chemical vapor deposited (CVD) graphene monolayer.

22. The process of claim 1, wherein a portion of the feedstock metal does not include a graphene deposit.

23. The process of claim 1, wherein the feedstock material comprises a copper puck.

24. The process of claim 23, wherein the feedstock material is surrounded by a feedstock material ring.

* * * * *